United States Patent [19]
Fukuda et al.

[11] Patent Number: 5,249,066
[45] Date of Patent: Sep. 28, 1993

[54] METHOD AND SYSTEM FOR WRITING AND READING CODED DATA

[75] Inventors: Masahiro Fukuda; Tsugio Noda, both of Isehara, Japan

[73] Assignee: Fujitsu Limited, Kanagawa, Japan

[21] Appl. No.: 782,766

[22] Filed: Oct. 22, 1991

Related U.S. Application Data

[63] Continuation-in-part of Ser. No. 762,057, Sep. 19, 1991, abandoned, which is a continuation of Ser. No. 478,372, Feb. 12, 1990, abandoned.

[30] Foreign Application Priority Data

Feb. 14, 1989 [JP] Japan .................... 1-34229
Jul. 28, 1989 [JP] Japan .................... 1-195753

[51] Int. Cl.⁵ .................. H04N 1/21; H04N 1/419
[52] U.S. Cl. .................. 358/433; 358/261.1; 358/427
[58] Field of Search .......... 358/427, 432, 433, 261.1, 358/261.3

[56] References Cited

U.S. PATENT DOCUMENTS

| | | | |
|---|---|---|---|
| 4,121,259 | 10/1978 | Preuss | 358/261.1 |
| 4,414,580 | 11/1983 | Johnsen | 358/261.3 |
| 4,581,638 | 4/1986 | Chiarigline | 358/433 X |
| 4,608,607 | 8/1986 | Adachi | 358/432 |
| 4,698,689 | 10/1987 | Tzou | 358/433 |
| 4,766,499 | 8/1988 | Inuzuka | 356/427 X |
| 4,805,030 | 2/1989 | Tanaka | 358/433 |
| 4,807,042 | 2/1989 | Tanaka | 358/433 |
| 4,809,081 | 2/1989 | Linehan | 358/261.3 X |
| 4,920,426 | 4/1990 | Hatori | 358/433 |

FOREIGN PATENT DOCUMENTS 2146874 8/1983 United Kingdom .

OTHER PUBLICATIONS

Video, Audio and Data Recording, vol. 79, (Mar. 22, 1988) pp. 199–201.
Optical Engineering, vol. 26, No. 7 (Jul. 1987) pp. 581–589.
"A Study on CODEC for Still Images with Sequential/Progressive Build Up", Miura et al, National Conference of Electronics and Information Communication Society, Fall 1988.
Digital Compression and Coding of Continuous-Tone Still Images Part 1: Requirements and Guidelines; ISO/IEC Publication; Date of Circulation: Mar. 15, 1991; Ref: ISO/IEC JTC 1/sc2 N2215.
A Study of CODEC for Still Images with Sequential/Progressive Build Up; By: Tsunehiro Miura et al, C & C Information Technology Res. Labs. NEC Corporation.

Primary Examiner—Benjamin R. Fuller
Assistant Examiner—Eric Frahm
Attorney, Agent, or Firm—Nikaido, Marmelstein, Murray & Oram

[57] ABSTRACT

A method of writing and reading coded data writes and reads the coded data which are coded by an orthogonal transform coding so that an original image can be restored progressively or sequentially, where the original image is divided into blocks of an arbitrary number of pixels and the coded data are obtained by coding quantization coefficients which are obtained when gradation levels of the pixels within each block are subjected to a two-dimensional discrete cosine transform. The method includes the steps of extracting the quantization coefficients for each restoration stage, subjecting the extracted quantization coefficients to a variable length coding, writing the variable length coded quantization coefficients into storage means as the coded data, reading the coded data from the storage means, restoring a code length of the coded data based on the read coded data, extracting coded data corresponding to the restored code length from the read coded data, and outputting the extracted coded data as coded data required in each restoration stage.

22 Claims, 18 Drawing Sheets

FIG. 1 PRIOR ART

| 10 | 15 | 13 | 14 | 14 | 14 | 14 | 14 |
|----|----|----|----|----|----|----|----|
| 13 | 16 | 19 | 18 | 20 | 24 | 22 | 22 |
| 13 | 15 | 16 | 20 | 18 | 21 | 22 | 22 |
| 14 | 14 | 17 | 21 | 21 | 22 | 23 | 19 |
| 14 | 16 | 17 | 21 | 21 | 22 | 24 | 23 |
| 14 | 15 | 22 | 22 | 22 | 25 | 26 | 24 |
| 15 | 17 | 25 | 29 | 29 | 46 | 33 | 35 |
| 27 | 34 | 39 | 43 | 50 | 62 | 45 | 54 |

FIG. 2 PRIOR ART

| 91 | -17 | -6 | 1 | -2 | 0 | 3 | -2 |
|----|-----|----|----|----|----|----|----|
| 28 | 8 | 3 | -2 | 1 | 1 | -4 | 2 |
| 14 | -3 | -1 | 1 | -1 | -3 | 3 | -1 |
| 14 | 4 | 1 | -1 | 0 | 1 | -1 | 2 |
| 9 | 1 | 0 | 1 | 2 | -3 | -2 | 0 |
| -6 | 0 | -1 | 1 | 0 | 1 | 0 | 0 |
| 0 | 2 | 1 | -1 | 1 | 0 | -1 | 0 |
| -1 | 0 | 0 | 0 | 0 | 0 | 0 | -1 |

FIG.3 PRIOR ART

| 16 | 11 | 10 | 16 | 24 | 40 | 51 | 61 |
|----|----|----|----|----|----|----|----|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

FIG.4 PRIOR ART

| 5 | -1 | 0 | 0 | 0 | 0 | 0 | 0 |
|---|----|---|---|---|---|---|---|
| -2 | 0 | 0 | 0 | 0 | 0 | 0 | 0 |
| 1 | 0 | 0 | 0 | 0 | 0 | 0 | 0 |
| -1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG.7 PRIOR ART

| STAGE | NO. OF CODED DATA TO BE READ | CODED DATA SEQUENCE |
|---|---|---|
| 1 | 1 | D1 |
| 2 | 4 | R0 I2,1,1 R0 I2,1,2 |
| 3 | 4 | R0 I3,1,1 R0 I3,1,2 |
| 4 | 5 | R0 I4,1,1 R0 I4,1,2 Reob |

FIG.8 PRIOR ART

1ST BLOCK: | D1 | R0 | I2,1,1 | R0 | I2,1,2 | R0 | I3,1,1 | R0 | I3,1,2 | R0 | I4,1,1 | R0 | I4,1,2 | Reob |

2ND BLOCK: | D2 | R0 | I2,2,1 | R1 | I2,2,2 | R2 | I3,2,1 | R1 | I3,2,2 | Reob | ---

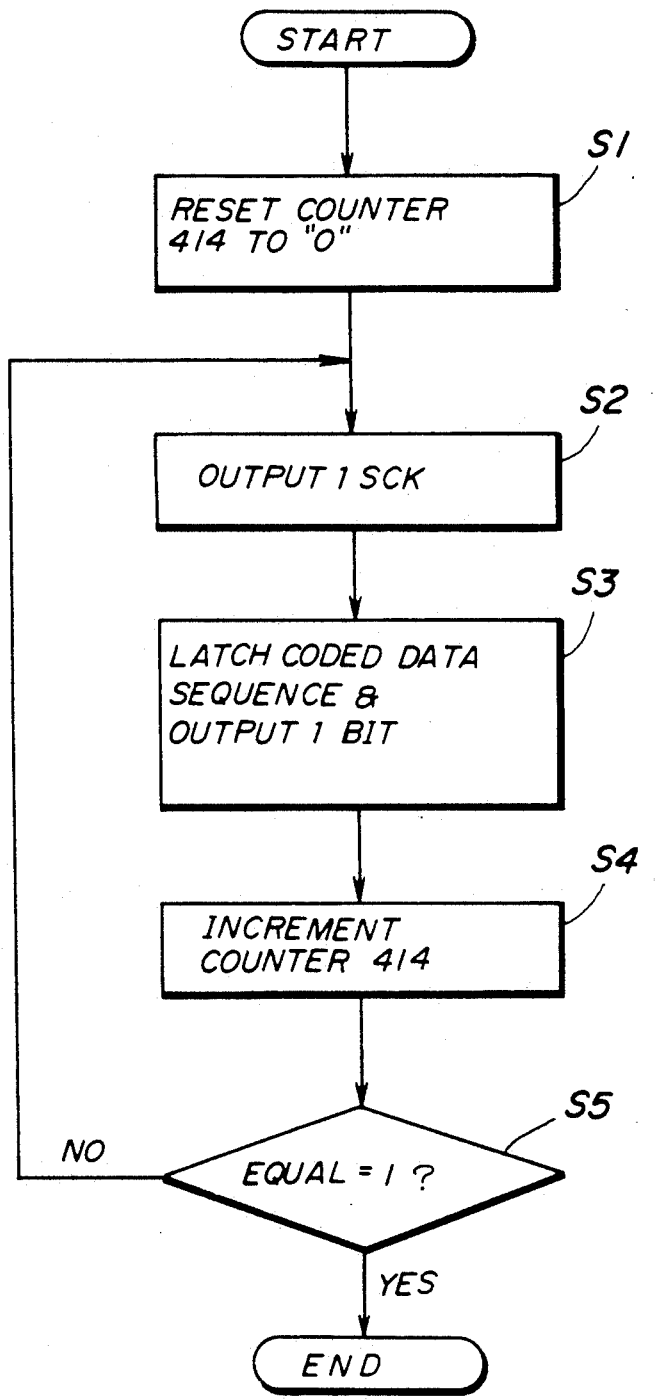

FIG. 19

STAGE "1"

| D1 | D2 | --- | Dm |
|---|---|---|---|
| 1ST BLOCK | 2ND BLOCK | | mTH BLOCK |

STAGE "2"

| R O | I2,1,1 | R O | I2,1,2 | R O | I2,2,1 | R 1 | I2,2,2 | --- |
|---|---|---|---|---|---|---|---|---|
| 1ST BLOCK | | | | 2ND BLOCK | | | | |

STAGE "3"

| R O | I3,1,1 | R O | I3,1,2 | R 2 | I3,2,1 | R 1 | I3,2,2 | --- |
|---|---|---|---|---|---|---|---|---|
| 1ST BLOCK | | | | 2ND BLOCK | | | | |

STAGE "4"

| R O | I4,1,1 | R O | I4,1,2 | Reob | Reob | --- |
|---|---|---|---|---|---|---|
| 1ST BLOCK | | | | | 2ND BLOCK | |

1ST BLOCK

2ND BLOCK

FIG.22

STAGE "1": | D1 | D2 | - - - - | Dm |
1ST BLOCK | 2ND BLOCK | | mTH BLOCK

STAGE "2": | R0 | I2,1,1 | R0 | I2,1,2 | R0 | I2,2,1 | Reob |
1ST BLOCK | 2ND BLOCK STAGE "3": | R0 | I3,1,1 | R0 | I3,1,2 | R0 | I3,1,3 | R1 | I3,2,1 | Reob |
1ST BLOCK | 2ND BLOCK STAGE "4": | R0 | I4,1,1 | Reob | R2 | I4,2,1 | R1 | I4,2,2 | Reob |
1ST BLOCK | 2ND BLOCK

METHOD AND SYSTEM FOR WRITING AND READING CODED DATA

This application is a continuation-in-part of application Ser. No. 762,057, filed Sep. 19, 1991, now abandoned, which is a continuation of application Ser. No. 478,372, filed Feb. 2, 1990, now abandoned.

BACKGROUND OF THE INVENTION

The present invention generally relates to methods and systems for writing and reading coded data, and more particularly to a method and a system for writing and reading coded data which are coded by the orthogonal transform coding so that an image can be restored progressively or sequentially.

The information quantity of the image data is considerably large compared to that of the numerical data. Hence, especially when storing and transmitting the image data of a gray scale image or a color image at a high speed and with a high quality, it is necessary to code the tone of each pixel with a high efficiency.

When making a data base search, it is desirable that the image is reproduced with a picture quality which improves progressively from a rough image to a fine image so that the user can generally recognize the image from an early stage of the data base search. By taking this measure, it is possible to efficiently determine whether the displayed image is a required data or an unwanted data.

On the other hand, when outputting the image on a hard copy apparatus such as a printer, it is necessary to restore the image sequentially from the top left to the bottom right of the image.

As a highly efficient method of compressing the image data, there is the adaptive discrete cosine transform (hereinafter simply referred to as an ADCT). According to the ADCT, the image is divided into blocks of 8×8 pixels, and an image signal of each block is transformed into coefficients of a spatial frequency distribution using the two-dimensional discrete cosine transform (hereinafter simply referred to as a DCT). The coefficients of the spatial frequency distribution are quantized at a threshold value adapted for the human eye, and the obtained quantization coefficients are coded by use of a Huffman code table.

Next, a description will be given of the ADCT by referring to FIGS. 1 through 6. For example, an image is divided into blocks of 8×8 pixels and each pixel is described in 256 gradation levels "0" through "255". When the pixels of one block have the gradation levels shown in FIG. 1, DCT coefficients shown in FIG. 2 are obtained by transforming the image data shown in FIG. 1 into coefficients of the spatial frequency distribution using the DCT. When the DCT coefficients shown in FIG. 2 are divided by respective threshold values shown in FIG. 3 and those values which have absolute values less than the corresponding threshold values are regarded as zero, quantization coefficients shown in FIG. 4 are obtained. The quantization coefficients shown in FIG. 4 are transformed using the Huffman code, for example, so as to obtain coded data for each block of the image.

FIG. 5 shows a coding circuit which employs the ADCT. An input image is divided into the blocks of 8×8 pixels as shown in FIG. 1, and an input image signal which is related to the blocks is supplied to a DCT part 141 via an input terminal 140. The numbers shown in FIG. 1 indicate the gradation levels of each pixel within the block. The DCT part 141 subjects the input image signal to an orthogonal transform in conformance with the DCT according to the following formula (1), where $F_j$ denotes the DCT coefficient and $f_i$ denotes the input image signal. Hence, coefficients of the spatial frequency distribution, that is, the DCT coefficients shown in FIG. 2, are obtained from the DCT part 141.

$$F_j = C_j \sum_{i=0}^{i=7} f_i \cos[(2i + 1)/16]j\pi \qquad (1)$$

The DCT coefficients from the DCT part 141 are supplied to a linear quantization part 142. The linear quantization part 142 refers to a quantization matrix 143 which includes a table of threshold values shown in FIG. 3 which are determined by a visual experimentation, and makes a linear quantization by dividing the DCT coefficients of the pixels by the corresponding threshold values. As a result, those DCT coefficients having absolute values less than the corresponding threshold values are regarded as zero, and quantization coefficients having values for only the DC components and small AC components are generated as shown in FIG. 4. In FIG. 4, the fractions are omitted. The DC component refers to a component (0, 0) in the x and y directions in FIG. 4.

The quantization coefficients which are arranged two-dimensionally as shown in FIG. 4 are scanned in a zigzag manner with a scanning sequence shown in FIG. 6 so that the data become arranged one-dimensionally. The one-dimensionally arranged data are supplied to a variable length coding part 144. With regard to the DC components, the variable length coding part 144 subjects a difference between a first DC component of each block and a DC component of a previous block to a variable length coding. In addition, with regard to the AC components, the variable length coding part 144 subjects a run length of a value of an invalid coefficient (zero coefficient) to a value of a significant coefficient (non-zero coefficient) to a variable length coding. The DC and AC components are coded using a code table 145 which includes a Huffman code table which is made based on statistics of each image. Coded data which is obtained from the variable length coding part 144 is stored in a code data storage part 146.

On the other hand, the coded data is restored into the image according to the following method. First, when sequentially restoring the image on the printer, for example, a process is carried out in a reverse sequence in FIG. 5. That is, the coded data of the variable length coding is returned to the one-dimensionally arranged quantization coefficients by referring to the Huffman code table. Then, a reference is made to the scanning sequence shown in FIG. 6 to return the one-dimensionally arranged quantization coefficients to the two-dimensionally arranged quantization coefficients shown in FIG. 4. The threshold values shown in FIG. 3 are multiplied to the two-dimensionally arranged quantization coefficients to obtain the DCT coefficients shown in FIG. 2. The original image is successively restored in blocks by carrying out a reverse DCT on the DCT coefficients.

On the other hand, when progressively restoring the original image, the image is progressively restored in a sequence of stages (or bands) "1", "2", "3", . . . as shown in FIG. 7. FIG. 7 shows a case where the restoration is made in four stages, that is, the stages "1" through "4". In this case, the number of coded data which are to be restored in each stage per block is designated in advance. The designated number of coded data are restored into the quantization coefficients, and the quantization coefficients are divided within the block into a number of stages (bands) from a low frequency range. The quantization coefficients which are divided in each stage and restored and the quantization coefficients which are restored in the previous stage are combined, and the quantization coefficients which are not received are all set to zero to make up one block. The reverse DCT is carried out progressively in this manner to restore the original image.

In the case shown in FIG. 7, one coded data is read out from each block in the stage "1". In terms of the coded data sequence, the coded data is read out from a first coded data sequence D1, that is, the coded data is read out from only the scanning sequence number "1" of each block shown in FIG. 6. The read out coded data is restored back into the DCT coefficients by being subjected to the reverse DCT. In other words, only the DC components are restored in the stage "1" because the coded data is read out from only the coded data sequence D1 of each block.

In the stage "2", four coded data are read out. The coded data are read out from coded data sequences R0, I2,1,1, R0 and I2,1,2. In FIG. 7, Dm denotes the coded data of the difference value of the DC component of the mth block, Il,m,n denotes the coded data of the value of the nth significant coefficient of the mth block in the lth stage (restoration stage "1"), Rk denotes the coded data which indicates that the run length of the invalid coefficient of the AC component is k, and Reob denotes the coded data which indicates that the end of the block ends with the run of the invalid coefficient.

Accordingly, the coded data (from the scanning sequence number "2" in FIG. 6) with respect to the first coefficient of the first block which has a run length "0" from the coded data sequence D1 which corresponds to the DC component and the coded data (from the scanning sequence number "3" in FIG. 6) with respect to the second coefficient of the first block which has the run length "0" from the coded data sequence D1 are read out in the stage "2". The read out coded data are restored back into the quantization coefficients by being subjected to the reverse DCT.

In the stage "3", the coded data are similarly read out from the scanning sequence numbers "4" and "5" in FIG. 6 and restored back into the quantization coefficients by being subjected to the reverse DCT.

In the stage "4", the coded data are similarly read out from the scanning sequence numbers "6" and "7" in FIG. 6 and restored back into the quantization coefficients by being subjected to the reverse DCT.

When carrying out the progressive restoration of the original image, it is possible to restore a rough image in the initial stage because the quantization coefficients in the initial stage mainly consist of low-frequency components. On the other hand, a more fine image is restored in the latter stage because the quantization coefficients in the latter stage mainly consist of high-frequency components. Hence, when making a product selection, for example, it is possible to make a rough selection in the initial stage and distinguish the unwanted products at an early stage.

A method of storing the coded data for both the sequential and progressive restoration is proposed in Miura et al., "A Study on CODEC for Still Images with Sequential/Progressive Build Up", National Conference of Electronics and Information Communication Society, Fall 1988. According to this proposed method, the image is divided into blocks of 8×8 pixels, and the image signal of each block is transformed into coefficients of the spatial frequency distribution in conformance with the DCT. The coefficients are quantized using threshold values which are adapted to the human eye, and the quantization coefficients are scanned in a zigzag manner as shown in FIG. 6 from the low-frequency components to the high-frequency components. With regard to DC components, a difference between the DC components of each block and a previous block is coded. On the other hand, with regard to the AC components, a run length of an invalid coefficient which is zero to a significant coefficient which is not zero is coded for each block. The above described coding process is carried out for all of the blocks of the image. Within each block, the quantized DCT coefficients which are subjected to the variable length coding form a single continuous code data sequence, and such a process is carried out with respect to all of the successive blocks. The coded data thus obtained and corresponding to the image are stored in a coded data storage part. In other words, the coding takes place in the coding circuit shown in FIG. 5 and is stored in the coded data storage part 146.

FIG. 8 shows an example of coded data sequences having the file format. In FIG. 8, the same designations are used as in FIG. 7.

When restoring the original from such coded data, a coded data reading circuit shown in FIG. 9 is used. The coded data reading circuit comprises a variable length restoration part 151, a restoration table 152, a coefficient extraction part 153, a coefficient storage part 154, a variable length coding part 155 and a code table 156. A coded data table 150 corresponds to the coded data table 146 shown in FIG. 5. The coded data reading circuit 151 reads out the variable length coded data from the coded data table 150 and carries out an image restoring process.

First, when sequentially restoring the original image, the coded data are successively read out in blocks from the coded data table 150. The original image is successively restored in blocks in a reverse sequence to the above and is supplied to a restoration circuit (not shown) via a path A and an output terminal T0.

On the other hand, when progressively restoring the original image, the storage location of the data corresponding to D1, D2, . . . which are necessary in the restoration stage "1" for the progressive restoration and the storage location of the data related to the next scanning sequence which are required in the restoration stage "2" are not known, because the coded data sequences of each block stored in the coded data storage part 150 are variable length. For this reason, the data corresponding to the image must once be restored to the quantization coefficients shown in FIG. 4, and a process must then be carried out to extract D1 which is required in the restoration stage "1" from each block and next extract the quantization coefficients of the scanning sequence which are required in the restoration stage "2".

Thus, the coded data sequences of the first, second, . . . blocks are read out from the coded data storage part 150 for one image as shown in FIG. 8 and supplied to the variable length restoration part 151. The variable length restoration part 151 refers to the restoration table 152 and restores the quantization coefficients shown in FIG. 4. The restoration table 152 stores a table which is in reverse to the Huffman code table. The coefficient extraction part 153 stores in the coefficient storage part 154 the quantization coefficients in blocks of each image. In order to carry out the progressive image restoration, the coefficient extraction part 153 thereafter extracts the designated number of quantization coefficients from the coefficient storage part 154 in blocks so as to carry out the variable length coding. The number of quantization coefficients is designated depending on the restoration stage shown in FIG. 7. As a result, the significant coefficients and the run length of the invalid coefficients to each significant coefficient are supplied to the variable length coding part 155. The variable length coding part 155 carries out a variable length coding to obtain coded data of the significant coefficients and the run lengths of the invalid coefficients which are received using the code table 156 which includes the Huffman code table. The number of coded data designated in the restoration stage are supplied to the restoration circuit via the output terminal T0.

Accordingly, in order to carry out the progressive image restoration according to the conventional method, the quantization coefficients which are restored from the coded data amounting to one image must be coded again into the coded data based on the variable length coding. For this reason, there is a problem in that a complex processing sequence must be carried out to extract the coded data corresponding to each restoration stage from the quantization coefficients which are stored in the coefficient storage part 154.

SUMMARY OF THE INVENTION

Accordingly, it is a general object of the present invention to provide a novel and useful method and system for writing and reading coded data, in which the problems described above are eliminated.

Another and more specific object of the present invention is to provide a method of writing and reading coded data which are coded by an orthogonal transform coding so that an original image can be restored progressively or sequentially, the original image being divided into blocks of an arbitrary number of pixels, the coded data being obtained by coding quantization coefficients which are obtained when gradation levels of the pixels within each block are subjected to a two-dimensional discrete cosine transform, the method comprising the steps of extracting the quantization coefficients for each restoration stage, subjecting the extracted quantization coefficients to a variable length coding, writing the variable length coded quantization coefficients into storage means as the coded data, reading the coded data from the storage means, restoring a code length of the coded data based on the read coded data, extracting coded data corresponding to the restored code length from the read coded data, and outputting the extracted coded data as coded data required in each restoration stage. According to the method of the present invention, it is possible to simplify the process of extracting the coded data when progressively restoring the original image. It is also possible to extract the coded data at a high speed.

Still another object of the present invention is to provide a system for writing and reading coded data which are coded by an orthogonal transform coding so that an original image can be restored progressively or sequentially, the original image being divided into blocks of an arbitrary number of pixels, the coded data being obtained by coding quantization coefficients which are obtained when gradation levels of the pixels within each block are subjected to a two-dimensional discrete cosine transform, the system comprising coefficient extraction means for extracting the quantization coefficients for each restoration stage, variable length coding means for subjecting the extracted quantization coefficients to a variable length coding, storage means for storing the variable length coded quantization coefficients as the coded data, code length restoration means for restoring a code length of the coded data based on the coded data read from the storage means, and coded data extraction means for extracting coded data corresponding to the restored code length from the read coded data and outputting the extracted coded data as coded data required in each restoration stage. According to the system of the present invention, it is possible to simplify the process of extracting the coded data when progressively restoring the original image. It is also possible to extract the coded data at a high speed.

Other objects and further features of the present invention will be apparent from the following detailed description when read in conjunction with the accompanying drawings.

BRIEF DESCRIPTION OF THE DRAWINGS

FIG. 1 shows one block of an original image;

FIG. 2 shows an example of DCT coefficients;

FIG. 3 shows an example of threshold values with respect to the DCT coefficients shown in FIG. 2;

FIG. 4 shows an example of quantization coefficients which are obtained by quantizing the DCT coefficients shown in FIG. 2 using the threshold values shown in FIG. 3;

FIG. 7 shows an example of coded data sequences which are read out, in restoration stages;

FIG. 8 shows an example of a structure of the coded data sequence;

FIG. 15 is a flow chart for explaining an operation of the coded data extraction part shown in FIG. 14;

FIG. 19 shows coded data sequences which are formed in the second embodiment for each of the restoration stages;

FIG. 22 shows coded data sequences of each restoration stage for explaining the third embodiment;

DESCRIPTION OF THE PREFERRED EMBODIMENTS

First, a description will be given of the operating principle of a first embodiment of a system for writing and reading coded data according to the present invention, by referring to FIG. 10. This first embodiment of the system employs a first embodiment of a method of writing and reading coded data according to the present invention.

Figure 10:
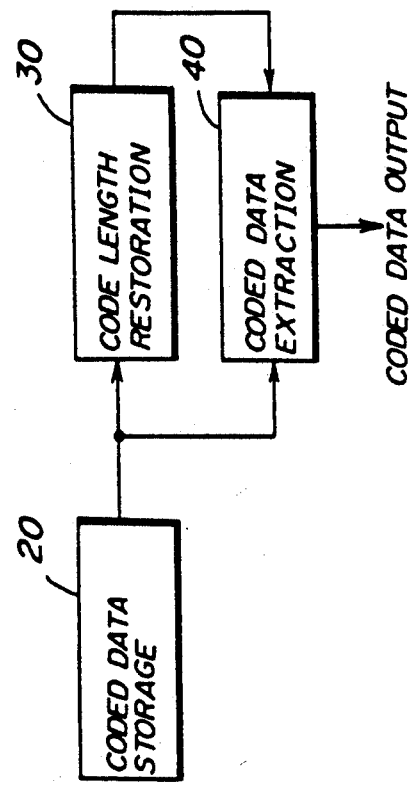
FIG. 10 is a system block diagram for explaining the operating principle of a first embodiment of a system for writing and reading coded data according to the present invention.

In FIG. 10, the system generally comprises a coded data storage means 20 for storing coded data, a code length restoration means 30 responsive to the coded data read out from the coded data storage means 20 for restoring the code length of the coded data, and a coded data extraction means 40 responsive to the coded data read out from the coded data storage means 20 for extracting and outputting a coded data amounting to the restored code length.

When storing the coded data into the coded data storage means 20, all of the coded data within the block are connected between the blocks. In the case of the sequential restoration, the coded data are successively read out from the coded data storage means 20 continuously from a starting address. On the other hand, in the case of the progressive restoration, the code length of the number of coded data which are required in the restoration stage for each block is restored in the code length restoration means 30, the coded data amounting to the code length are extracted by the coded data extraction means 40 and the coded data required in the restoration stage are read out from the coded data storage means 20. Accordingly, it is possible to simplify the processing sequence when extracting the coded data for the purpose of progressively restoring the image.

Figure 11:
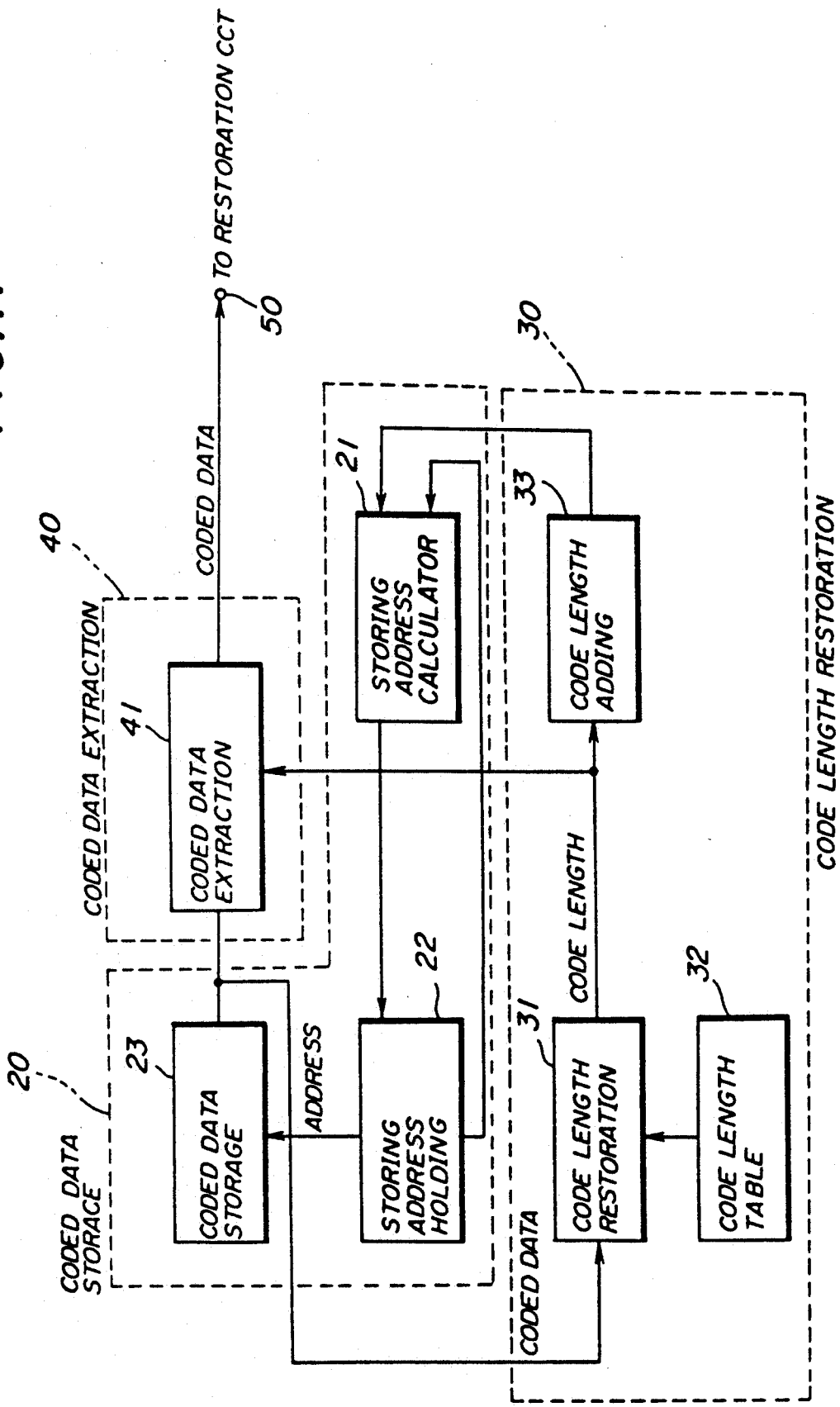
FIG. 11 is a system block diagram showing the first embodiment of the system according to the present invention.

Next, a more detailed description will be given of the first embodiment of the system according to the present invention, by referring to FIG. 11. In FIG. 11, those parts which are essentially the same as those corresponding parts in FIG. 10 are designated by the same reference numerals, and a description thereof will be omitted.

In FIG. 11, the coded data storage means 20 is made up of a storing address calculation part 21, a storing address holding part 22 and a coded data storage part 23. The storing address calculation part 21 calculates a storing address in response to an output of the code length restoration means 30. The storing address holding part 22 is coupled to the storing address calculation part 21 and holds the storing address which is calculated in the storing address calculation part 21. The coded data storage part 23 receives the output address of the storing address holding part 22.

The code length restoration means 30 is made up of a code length restoration part 31, a code length table 32 and a code length adding part 33. The code length restoration part 31 restores the code length responsive to an output of the coded data storage means 20 based on the code length table 32. The code length adding part 33 adds the code length in response to an output of the code length restoration part 31. An output of the code length adding part 33 is supplied to the storing address calculation part 21.

The coded data extraction means 40 is made up of a coded data extraction part 41. The coded data extraction part 41 outputs coded data which are supplied to a restoration circuit (not shown).

Figure 12:
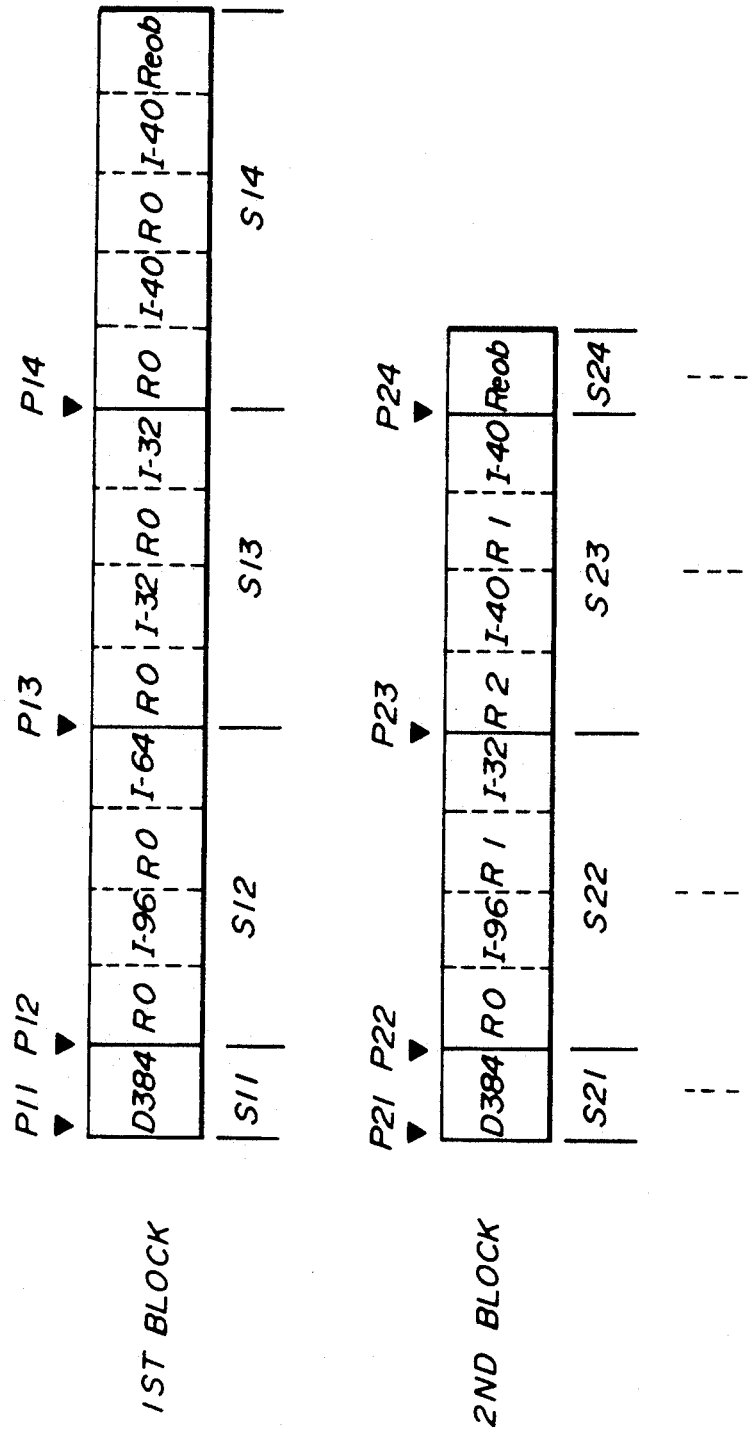
FIG. 12 is a diagram for explaining the method of extracting the coded data in the first embodiment.

In this embodiment, a starting address Pmn of an nth restoration stage of an mth block and a code length Smn of the nth restoration stage of the mth block are obtained for each block as shown in FIG. 12, so as to extract the required coded data from the continuous coded data sequence amounting to one image. Measures are taken so that the quantization coefficients are not restored from the coded data and no process is carried out to code the coded data. Accordingly, the coded data sequence which is required in the restoration stage of the progressive restoration can be read out at a high speed from the continuous coded data sequence which amounts to one image and is stored for the sequential restoration.

The coded data sequences shown in FIG. 12 for each block are connected between the blocks and stored in the coded data storage part 23, similarly to the conventional system. When sequentially restoring the image from the coded data sequences, the coded data are continuously read out from the starting address of the coded data storage part 23 and are supplied to the restoration circuit via a terminal 50.

Figures 13, 16:
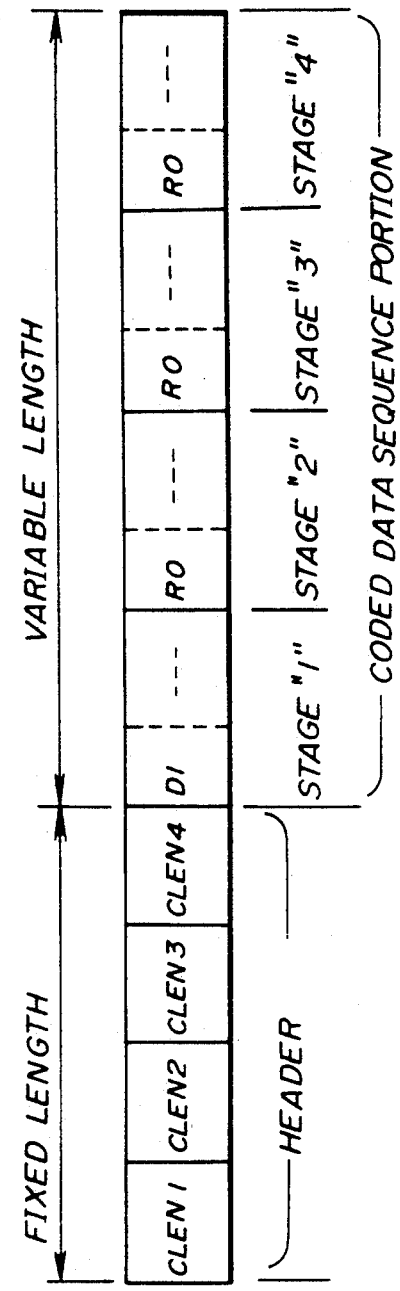
FIG. 13 shows coded data sequences which are read out in restoration stages of the first embodiment.
FIG. 16 shows coded data which are processed in a second embodiment of the system for writing and reading coded data according to the present invention.

On the other hand, when progressively restoring the image, the number of coded data which are restored in one restoration stage is designated as shown in FIG. 13, similarly to the case described in conjunction with FIG. 7. First, the starting address of each block (block addresses P11, P21, . . . ) are held in the storing address holding part 22. For example, Reob is detected from the coded data which are stored in the coded data storage part 23 and the starting address of each block obtained by detecting the boundary of each block is held. The calculation of the starting address is carried out in the storing address calculation part 21 which receives the output of the code length restoration means 30.

The coded data (D384, . . . ) are read out from the coded data storage part 23 starting from the starting address of the first block (P11, address 0). The read out coded data are supplied to the coded data extraction part 41 and the code length restoration part 31. The code length restoration part 31 restores the code length of the received coded data (D384, . . . ) by use of the code length table 32 which is made up of a code length table of each coded data, and the restored code length is supplied to the code length adding part 33. At the same time, the restored code length is supplied to the coded data extraction part 41. For example, when the code length of the coded data D384 is 10 bits, the code length "10" is supplied to the code length adding part 33 and the coded data extraction part 41.

Because the number of coded data restored in the first stage is one, the code length adding part 33 supplies the code length "10" as it is to the storing address calculation part 21. The storing address calculation part 21 adds the starting address P11 (=0) of the first block held in the storing address holding part 22 and the code length "10" of the first stage which is calculated in the code length adding part 33. In addition, the storing address calculation part 21 renews the address of the first block which is held in the storing address holding part 22 to the starting address P12 (P11+"10"="10") of the second stage.

On the other hand, the coded data extraction part 41 extracts the coded data amounting to the code length "10", that is, the coded data D384 of the first stage of the first block. The extracted coded data are supplied to the restoration circuit via the terminal 50.

When the extraction of the coded data of the first block ends, the first coded data (D384, ...) of the second block is read out from the coded data storage part 23 according to the starting address (P21) of the second block and supplied to the coded data extraction part 41 and the code length restoration part 31. The code length restoration part 31 restores the code length of the received coded data (D384, ...) and supplies the code length "10" of the coded data D384 to the code length adding part 33 and the code data extraction part 41.

Because the number of coded data restored in the first stage is one, the code length adding part 33 supplies the received code length "10" to the storing address calculation part 21 as it is. The storing address calculation part 21 adds the starting address P21 of the second block held in the storing address holding part 22 and the code length "10" of the first stage calculated in the code length adding part 33. In addition, the storing address calculation part 21 renews the address of the second block which is held in the storing address holding part 22 to the starting address P22 (P21+"10") of the second stage.

On the other hand, the coded data extraction part 41 extracts the coded data amounting to the code length "10", that is, the coded data D384 of the first stage of the second block. The extracted coded data are supplied to the restoration circuit via the terminal 50. When the extraction of the second block ends, the coded data of the first stage are extracted for all of the blocks which correspond to one image, and the image of the first stage is restored in the restoration circuit.

The image restoring process for the second and subsequent stages is carried out similarly to the first stage. First, the coded data (R0, I-96, R0, I-64, ...) is read out from the coded data storage part 23 starting from the starting address P12 (="10") of the second stage of the first block. The read out coded data are supplied to the coded data extraction part 41 and the code length restoration part 31. The code length restoration part 31 restores the code length of the received coded data (R0, I-96, R0, I-64, ...) by use of the code length table 32, and the restored code length is supplied to the code length adding part 33. At the same time, the restored code length is supplied to the coded data extraction part 41. For example, when the code length of the coded data R0 is 4 bits, the code length "4" is supplied to the code length adding part 33 and the coded data extraction part 41.

Because the number of coded data restored in the second stage is four, the code length adding part 33 holds the received code length "4", adds the code lengths "8", "4" and "7" of the remaining three coded data (I-96, R0, I-64) and supplies the added value "23" to the storing address calculation part 21. The storing address calculation part 21 adds the starting address P12 (="10") of the second stage of the first block held in the storing address holding part 22 and the code length "23" of the second stage which is calculated in the code length adding part 33. In addition, the storing address calculation part 21 renews the address of the first block which is held in the storing address holding part 22 to the starting address P13 (P12+"23"="33") of the third stage.

On the other hand, the coded data extraction part 41 successively extracts the coded data amounting to the code length "23" (added value of code lengths "4", "8", "4" and "7"), that is, the coded data (R0, I-96, R0, I-64) of the second stage of the first block. The extracted coded data are supplied to the restoration circuit via the terminal 50.

When the extraction of the coded data ends for the first block, the coded data (R0, I-96, R1, I-32, ...) are read out from the coded data storage part 23 according to the starting address P22 of the second stage of the second block, and the read out coded data are supplied to the coded data extraction part 41 and the code length restoration part 31. The code length restoration part 31 restores the code length ("4", "8", "5", "6", ...) of the received coded data (R0, I-96, R1, I32, ...) by use of the code length table 32, and the restored code lengths are supplied to the coded data extraction part 41 and the code length adding part 33.

The code length adding part 33 adds the code lengths of the four coded data which are restored in the second stage, and the added value "23" is supplied to the storing address calculation part 21. The storing address calculation part 21 adds the starting address P22 of the second stage of the second block held in the storing address holding part 22 and the code length "23" of the second stage which is calculated in the code length adding part 33. In addition, the storing address calculation part 21 renews the address of the second block which is held in the storing address holding part 22 to the starting address P23 (P22+"23") of the third stage.

On the other hand, the coded data extraction part 41 successively extracts the coded data amounting to the code length "23" (added value of code lengths "4", "8", "5" and "6"), that is, the coded data (R0, I-96, R1, I32) of the second stage of the second block. The extracted coded data are supplied to the restoration circuit via the terminal 50. When the extraction of the second block ends, the coded data of the second stage are extracted for all of the blocks which correspond to one image, and the image of the second stage is restored in the restoration circuit.

The above described image restoring process is repeated until the fourth stage. As a result, the coded data of the first through fourth stages are extracted, and the images of the stages are successively restored.

Figure 14:
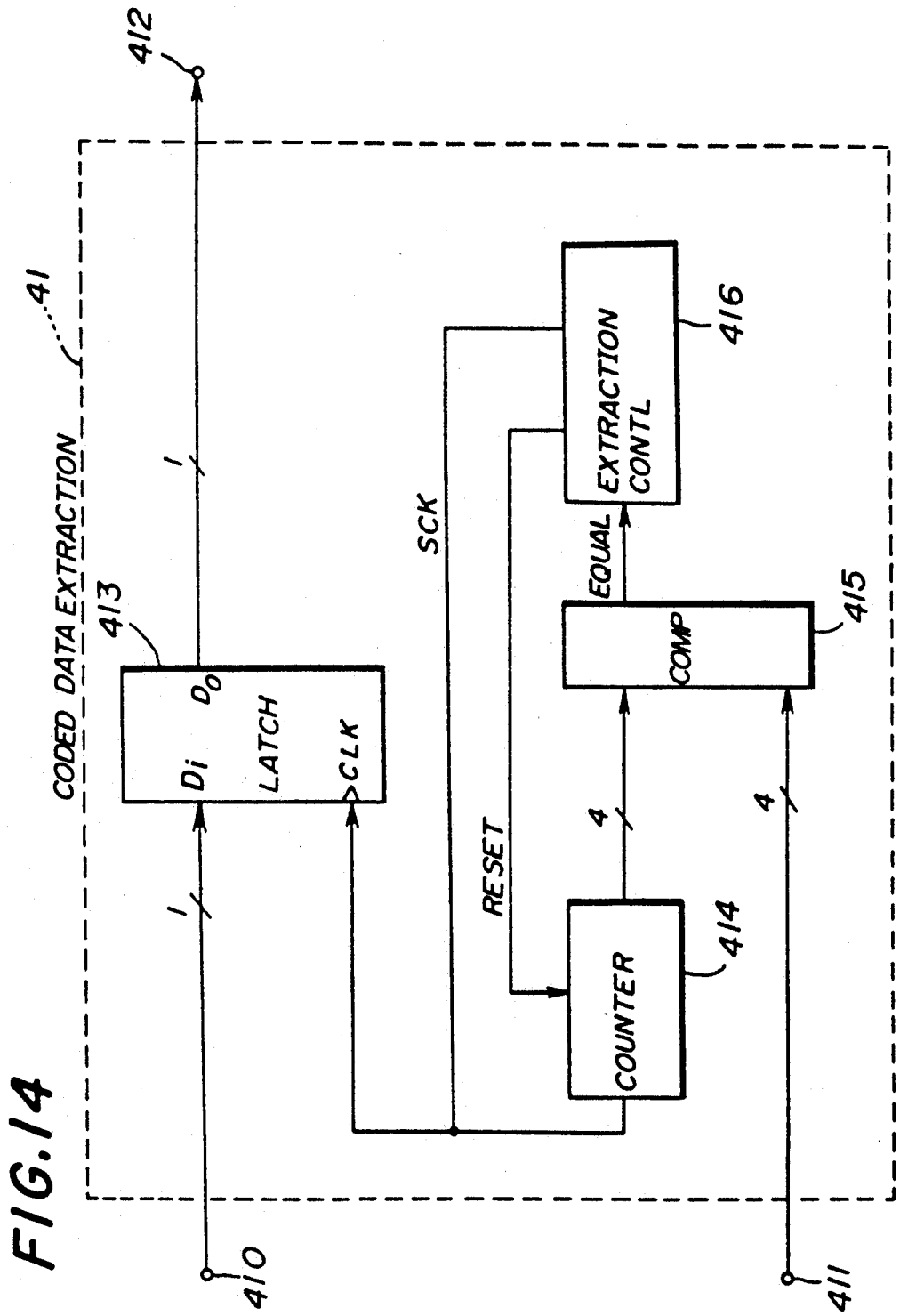
FIG. 14 is a system block diagram showing an embodiment of a coded data extraction part shown in FIG. 11.

Next, a description will be given of an embodiment of the coded data extraction part 41 shown in FIG. 11, by referring to FIG. 14. In FIG. 14, the coded data extraction part 41 comprises a latch circuit 413, a counter 414, a comparator 415 and an extraction controller 416. The coded data stored in the coded data storage part 23 is read out and supplied to a data input terminal Di of the latch circuit 413 via a terminal 410. The code length from the code length restoration part 31 is supplied to one input terminal of the comparator 415 via a terminal 411. Coded data from a data output terminal Do of the latch circuit 413 is output as the output of the coded data extraction part 41.

FIG. 15 is a flow chart for explaining an operation of the coded data extraction part 41. For the sake of convenience, it is assumed that the terminal 410 receives the coded data sequence from the coded data storage part 23 one bit at a time and that the terminal 411 receives the code length "10" from the code length restoration part 31.

In FIG. 15, the extraction controller 416 resets the counter 414 to "0" in a step S1 by supplying a reset signal RESET to a reset terminal of the counter 414. After receiving a code length calculation complete signal via a path which is not shown, the extraction controller 416 outputs one clock signal SCK in a step S2. The clock signal SCK is supplied to a clock terminal CLK of the latch circuit 413 and to the counter 414. Hence, the latch circuit 413 latches the received coded data sequence as the transmitting coded data sequence and outputs one bit in a step S3. In addition, the counter 414 increments the count by one in a step S4 and supplies a value "1" to the other input terminal of the comparator 415. The extraction controller 416 discriminates in a step S5 whether or not the output value of the counter 414 becomes equal to the code length "10" from the code length restoration part 31 and a signal EQUAL which has a value "1" is output from the comparator 415. The comparator 415 outputs the signal EQUAL which has the value "1" only when the two compared values match each other. Hence, the extraction controller 416 outputs the clock signal SCK nine times until the signal EQUAL which has the value "1" is received from the comparator 415. By the above described process, the continuous ten bits of the coded data sequence which is received from the coded data storage part 23 are output from the coded data extraction part 41 as the transmitting coded data sequence.

When continuously extracting more than one coded data, the above described operation is repeated.

In this embodiment, the maximum code length is assumed to be "15". For this reason, the code length restoration part 31 restores the code length by using the data which has the bit width of 15 bits and is obtained by subjecting the coded data sequence from the coded data storage part 23 to a serial-to-parallel conversion.

Next, a description will be given of the operating principle of a second embodiment of the system for writing and reading coded data according to the present invention, by referring to FIGS. 16 and 17. This second embodiment of the system employs a second embodiment of a method of writing and reading coded data according to the present invention.

In this embodiment, each original image is divided into blocks of 8×8 pixels, and the gradation levels of the pixels within each block are transformed into DCT coefficients according to the DCT and then quantized into quantization coefficients similarly as described before in conjunction with FIGS. 1 through 4. But when storing the quantization coefficients into a coded data storage part, a coded data sequence having a structure shown in FIG. 16 is employed.

When it is assumed that there are up to the fourth progressive restoration stage, the coded data sequence of the first stage is formed by extracting only the quantization coefficients D1, D2, . . . of the first stage of each block. Then, the coded data sequence of the second stage is formed by extracting only the quantization coefficients of the second stage of each block. The quantization coefficients are extracted to the final fourth stage in this manner to form the coded data sequence of the fourth stage. Each of these coded data sequences are compressed based on the Huffman code and connected.

In addition, a header is provided at the beginning of the coded data sequence. This header includes a code quantity information on the coded data sequence for each restoration stage. In other words, a header portion CLEN1 of the header includes the code quantity information on the compressed coded data sequence of the first stage. Similarly, header portions CLEN2, CLEN3 and CLEN4 respectively include the code quantity information on the compressed coded data sequences of the second, third and fourth stages. The header portions CLEN1 through CLEN4 have a fixed length. For this reason, the starting positions of the coded data sequences of the restoration stages can be obtained with ease by reading out the header portions CLEN1 through CLEN4. This means that it is possible to simply obtain the coded data sequences for each of the restoration stages. As a result, it is possible to obtain coded data sequences such that it is possible to quickly make the progressive restoration and also make the sequential restoration.

Figure 17:
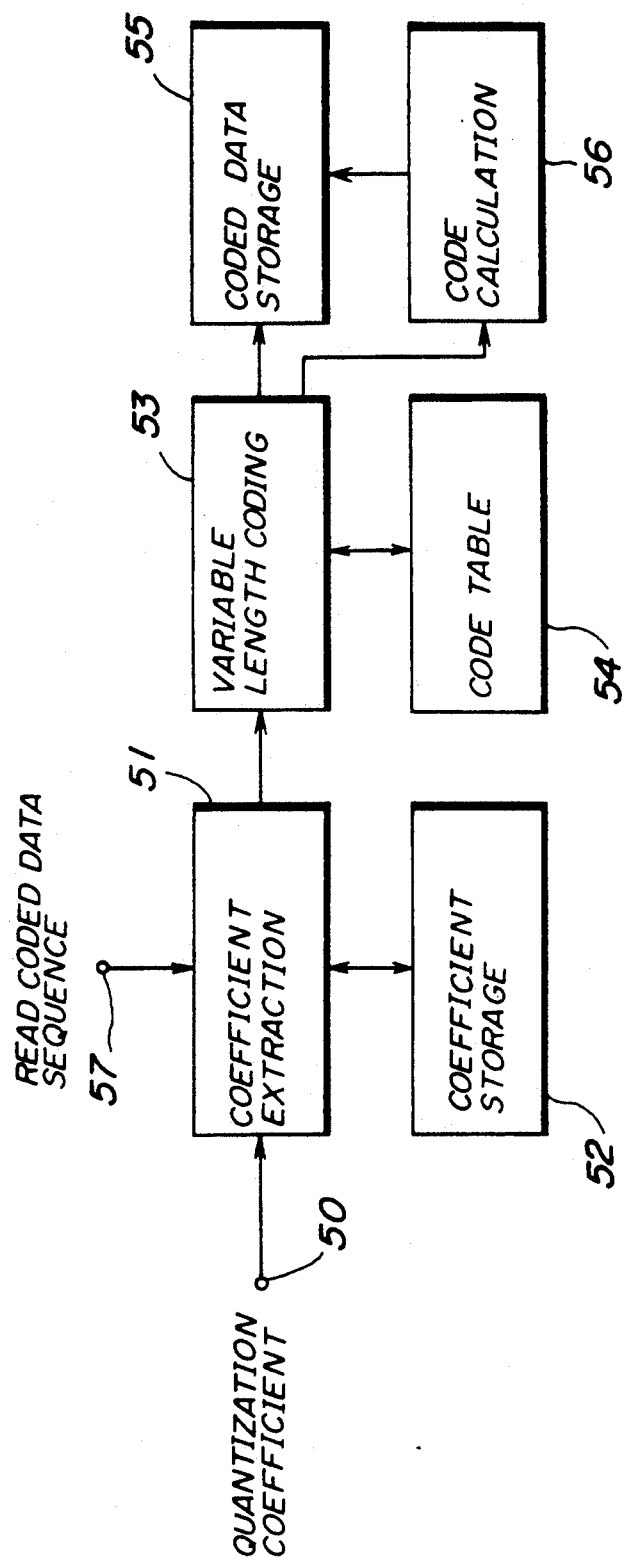
FIG. 17 is a system block diagram for explaining the operating principle of the second embodiment of the system.

A code forming circuit shown in FIG. 17 is used to form the coded data sequence having the structure shown in FIG. 16. In FIG. 17, the code forming circuit comprises a coefficient extraction part 51, a coefficient storage part 52, a variable length coding part 53, a code table 54, a coded data storage part 55 and a code counting part 56.

Quantization coefficients of each block shown in FIG. 4 and corresponding to one image are supplied to the coefficient extraction part 51 via a terminal 50. The coefficient extraction part 51 temporarily stores the quantization coefficients in the coefficient storage part 52. For example, the read coded data sequence of the restoration stage shown in FIG. 7 is supplied to the coefficient extraction part 51 via a terminal 57. Based on the read coded data sequence of the restoration stage, the coefficient extraction part 51 reads out predetermined quantization coefficients from each block in a sequence of the stages. The predetermined quantization coefficients are supplied to the variable length coding part 53 which compresses the predetermined quantization coefficients by the Huffman code, for example, by referring to the code table 54. Hence, the variable length coding part 53 compresses each of the coded data sequences of the first through fourth stages, and the compressed coded data sequences are supplied to the coded data storage part 55 for each stage. The variable length coding part 53 also supplies to the code counting part 56 the code length of each restoration stage.

As shown in FIG. 16, the header has a fixed length and the bit lengths of the coded data sequences of the restoration stages are included in the header portions CLEN1 through CLEN4. In addition, the code counting part 56 successively adds the bit lengths which are written in the header portions CLEN1 through CLEN4 and calculates an address information which sets the coded data sequence for each restoration stage. For this reason, the coded data storage part 55 can connect and store the header and the coded data portion as shown in FIG. 16 based on the address information.

Because it is possible to connect and store the header which indicates the total code quantity of the restoration stages and the coded data portion related to the coded data sequences of each of the restoration stages, both the progressive and sequential restoration can be carried out satisfactorily. That is, in the case of the progressive restoration, the coded data are read out continuously from the start based on the code lengths written in the header portions CLEN1 through CLEN4 of the header. On the other hand, in the case of the sequential restoration, the required coded data are extracted from the continuous coded data sequences by using the code lengths which are written in the header portions CLEN1 through CLEN4 of the header. Accordingly, the operation of reading out the coded data becomes simple for the sequential restoration, and in addition, it is possible to read out the coded data at a high speed for the progressive restoration.

Figure 18:
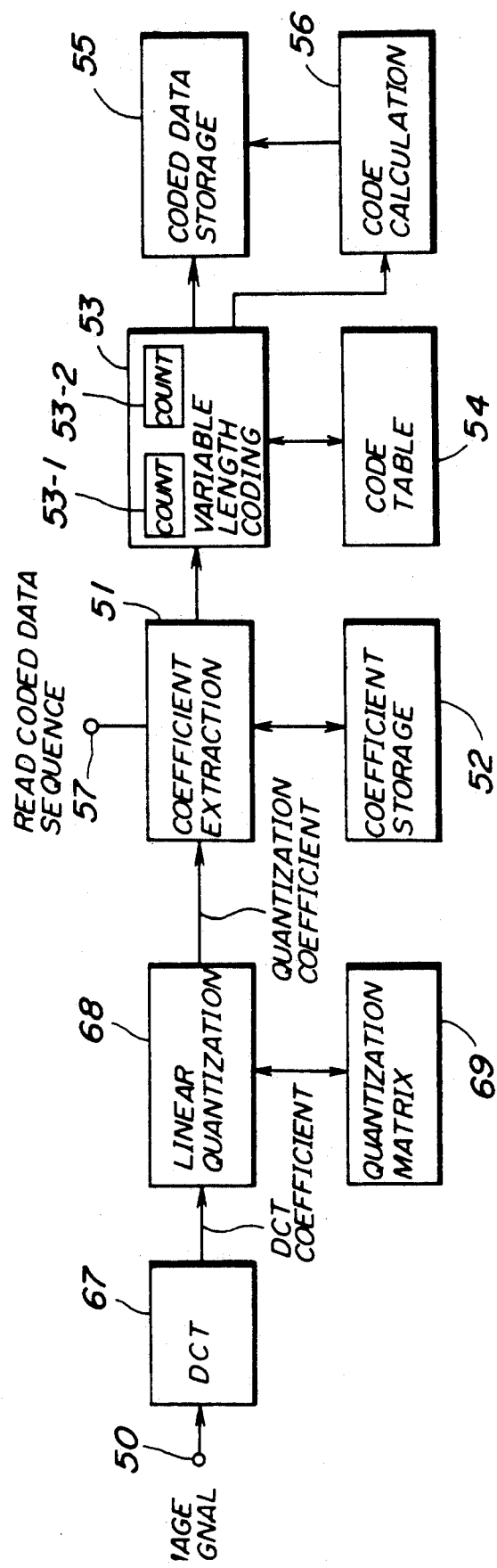
FIG. 18 is a system block diagram showing an essential part of the second embodiment of the system according to the present invention.
Figure 20:
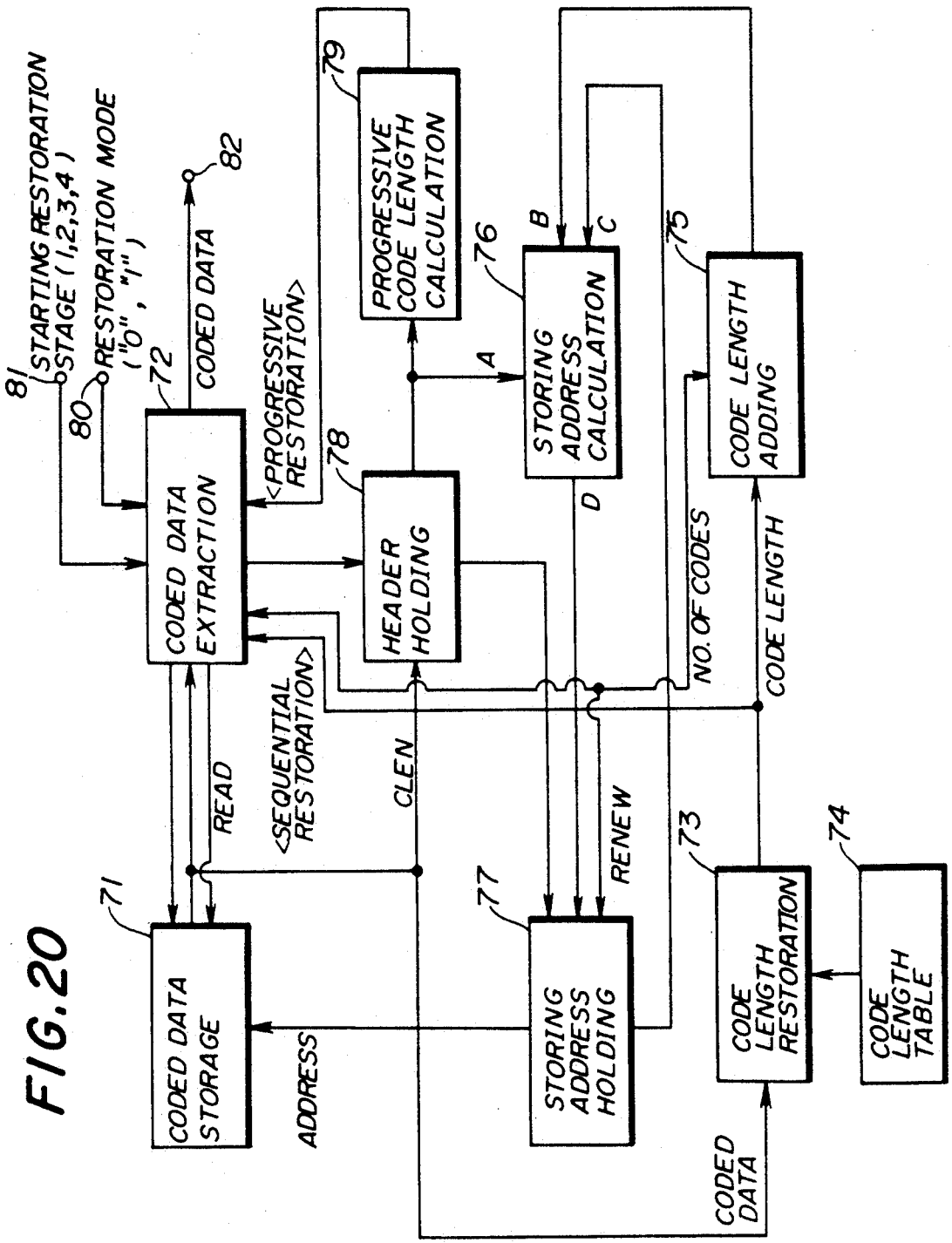
FIG. 20 is a system block diagram showing another essential part of the second embodiment of the system according to the present invention.

Next, a more detailed description will be given of the second embodiment of the system according to the present invention, by referring to FIG. 18. FIG. 18 shows an essential part of the second embodiment of the system. In FIG. 18, those parts which are essentially the same as those corresponding parts in FIG. 17 are designated by the same reference numerals, and a description thereof will be omitted. FIG. 19 shows coded data sequences which are formed in this embodiment for each of the restoration stages, and FIG. 20 shows another essential part of the second embodiment of the system.

Figures 5, 6:
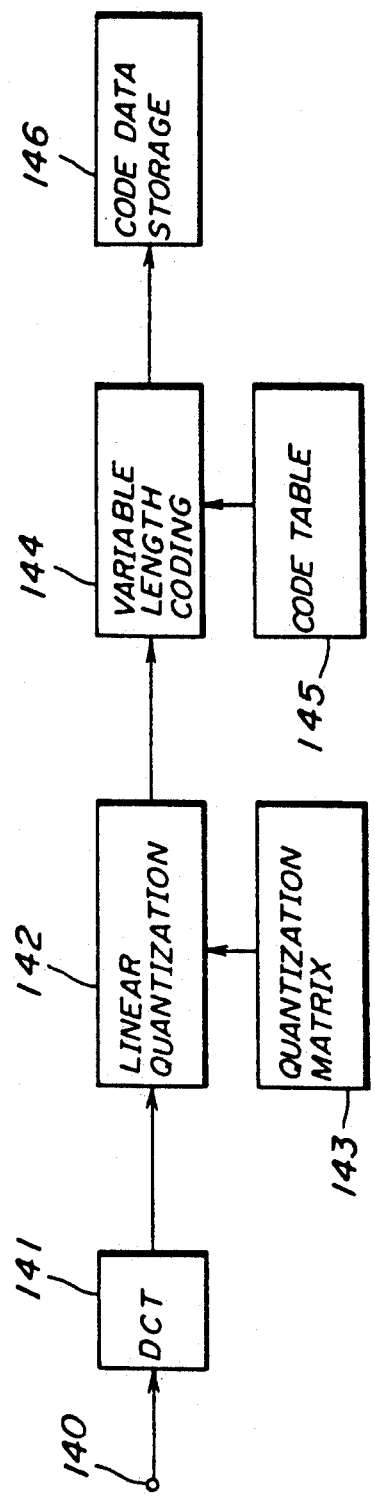
FIG. 5 is a system block diagram showing an example of a conventional coding circuit employing the ADCT.
FIG. 6 shows an example of a scanning sequence of the quantization coefficients shown in FIG. 4.
Figure 9:
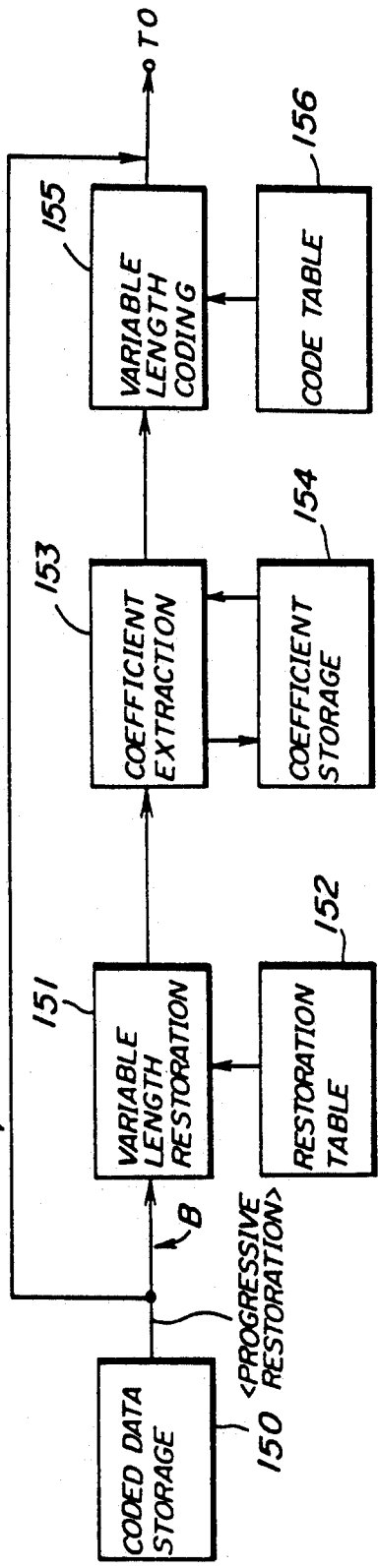
FIG. 9 is a system block diagram showing an example of a conventional coded data reading circuit.

First, a description will be given of the image data coding of the second embodiment, by referring to FIGS. 18 and 19. In FIG. 18, the coded data reading circuit comprises a DCT part 67, a linear quantization part 68 and a quantization matrix 69 in addition to the elements shown in FIG. 17. The DCT part 67, the linear quantization part 68 and the quantization matrix 69 respectively correspond to the DCT part 141, the linear quantization part 142 and the quantization matrix 143 shown in FIG. 5.

An input image signal which is obtained by dividing the image into blocks of 8×8 pixels as shown in FIG. 1 is applied to the DCT part 67 via the terminal 50. Similarly as described before in conjunction with FIG. 1, the DCT part 67 subjects the input image signal to an orthogonal transform in conformance with the DCT. Hence, coefficients of the spatial frequency distribution, that is, the DCT coefficients shown in FIG. 2, are obtained from the DCT part 67 and is supplied to the linear quantization part 68. The linear quantization part 68 refers to the quantization matrix 69 which includes a table of threshold values shown in FIG. 3 which are determined by a visual experimentation, and makes a linear quantization by dividing the DCT coefficients of the pixels by the corresponding threshold values. As a result, those DCT coefficients having absolute values less than the corresponding threshold values are regarded as zero, and quantization coefficients having values for only the DC components (the data at positions of the scanning sequence "1" shown in FIG. 6) and small AC components are generated as shown in FIG. 4. The quantization coefficients are supplied to the coefficient extraction part 51 which stores the quantization coefficients of each block of the image into the coefficient storage part 52.

For example, the read coded data sequence of the restoration stage shown in FIG. 7 is supplied to the coefficient extraction part 51 from the terminal 57. Hence, the coefficient extraction part 51 refers to the read coded data sequence of the restoration stage and first extracts the data $D_m$ ($m=1, 2, \ldots$) of the restoration stage "1" out of the quantization coefficients of each block stored in the coefficient storage part 52. The data $D_m$ is extracted for each block from the positions of the scanning sequence "1" of the quantization coefficients shown in FIG. 6 and supplied to the variable length coding part 53. In this state, the coefficient extraction part 51 informs the variable length coding part 53 that the restoration stage is the restoration stage "1" by supplying a pulse signal or the like.

The variable length coding part 53 holds the data which indicates the restoration stage "1" in a first counter 53-1. The data $D_1$ through $D_m$ of the restoration stage "1" shown in FIG. 19 are compressed by referring to the code table 54, and the bit length of the compressed coded data is counted in a second counter 53-2. The variable length coding part 53 supplies the compressed coded data to the coded data storage part 55. As described before in conjunction with FIG. 16, the coded data which is stored in the coded data storage part 55 is made up of the header which has the fixed length and the coded data sequence portion which has a variable length. Accordingly, the starting position from which the coded data sequence of the compressed data $D_1, \ldots$ is stored in the coded data storage part 55 is known for the restoration stage "1".

When the coded data sequence of the restoration stage "1" is stored in the coded data storage part 55, the length of the compressed coded data of the restoration stage "1" is supplied from the second counter 53-2 to the coded data storage part 55. The length of the compressed coded data is written into the header portion CLEN1 of the header with a fixed length, as the length of the coded data of the restoration stage "1". At the same time, the value of the header portion CLEN1 is supplied from the second counter 53-2 to the code counting part 56. Hence, the code counting part 56 adds the value of the header portion CLEN1 and the length of the header so as to obtain the starting position from which the coded data sequence of the restoration stage "2" is stored in the coded data storage part 55.

Next, the coefficient extraction part 51 carries out a control with respect to the restoration stage "2" based on the read coded data sequence of the restoration stage "2" shown in FIG. 7. Thus, the quantization coefficients which are shown as the second and third in scanning sequence of FIG. 6 (first and second as AC components) are extracted by the coefficient extraction part 51. Based on the format of the read coded data sequence of the restoration stage shown in FIG. 7, the coefficient extraction part 51 outputs the coded data of the restoration stage "2" shown in FIG. 19 similarly as in the case of the restoration stage "1". Hence, the first counter 53-1 of the variable length coding part 53 indicates the restoration stage "2", and the variable length coding part 53 compresses the coded data of the restoration stage "2" by referring to the code table 54. The length of the compressed coded data is counted in the second counter 53-2 and is supplied to the coded data storage part 55. The compressed coded data of the restoration stage "2" are stored in the coded data storage part 55 from the starting position of the restoration stage "2" calculated in the code counting part 56. Then, the counted value of the second counter 53-2 is supplied to the code counter part 56, and an operation similar to the above described is carried out to obtain the starting position from which the coded data sequence of the restoration stage "2" is stored in the coded data storage part 55. Of course, the code length which is counted in the second counter 53-2 is written into the header portion CLEN2 of the header with a fixed length.

The coded data of the restoration stages "3" and "4" are stored similarly into the coded data storage part 55.

FIG. 20 shows a coded data reading circuit for reading the stored coded data from the coded data storage part 55 for the purpose of restoring the original image. In FIG. 20, the coded data reading circuit comprises a coded data storage part 71 which corresponds to the coded data storage part 55 shown in FIG. 18, a coded data extraction part 72, a code length restoration part 73, a code length table 74, a code length adding part 75, a storing address calculation part 76, a storing address holding part 77, a header holding part 78 and a progressive code length calculation part 79.

The coded data storage part 71 stores the coded data made up of the header which has the fixed length and the coded data sequence portion which has the variable length as shown in FIG. 16. The contents of the coded data sequence stored in the coded data storage part 71 are as shown in FIG. 19.

The coded data extraction part 72 prestores the number of codes for each stage.

The storing address calculation part 76 receives inputs A, B and C and supplies an output D. Initially, $D=f(A)$. During the coded data extraction, the storing address calculation part 76 supplies an output D such that $D=B+C$.

Next, a description will be given of the operation of the coded data reading circuit shown in FIG. 20 for a case (i) where the original image is restored progressively and a case (ii) where the original image is restored sequentially.

In the case (i), a restoration mode data "0", for example, is supplied to the coded data extraction part 72 via a terminal 80 so as to control the coded data reading circuit to a progressive restoration mode. A starting restoration stage ("1", "2", "3" or "4") is supplied to the coded data extraction part 72 via a terminal 81.

First, the header (CLEN1 through CLEN4) which is added to the beginning of the coded data sequence as shown in FIG. 16 is read out from the coded data storage part 71 and is held in the header holding part 78. The header information corresponding to the stages which are to be restored is supplied from the header holding part 78 to the progressive code length calculation part 79 which calculates the total code length of the restoration stages. For example, when restoring the restoration stage "2", the code length information CLEN1 (for example, 50 bits) of the restoration stage "1" and the code length information CLEN2 (for example, 100 bits) of the restoration stage "2" are added in the progressive code length calculation part 79. In other words, the code length CLEN1+CLEN2 (for example, 150 bits) up to the restoration stage "2" is calculated in the progressive code length calculation part 79. In addition, the storing address calculation part 76 sets the output D in FIG. 20 to "32", for example, and holds the starting address of the coded data in the storing address holding part 77.

When the extraction of the coded data starts from the restoration stage "2", for example, the storing address calculation part 76 calculates $D=32+CLEN1$ and holds this value of D in the storing address holding part 77. Out of the coded data sequence portion which is successively read out from the coded data storage part 71 starting from the address "32" which is held in the storing address holding part 77, the coded data extraction part 72 extracts the coded data amounting to the calculated code length CLEN1+CLEN2 (for example, 150 bits) and supplies the extracted coded data to the restoration circuit (not shown) via a terminal 82. The image of the restoration stage "1" is restored in the restoration circuit when the coded data of CLEN1 (for example, 50 bits) are received, and the coded data of CLEN2 is then restored to progressively restore the image of the restoration stage "2".

The image of the restoration stages "3" and after can be restored progressively by a similar procedure by calculating the code length of each stage which is to be restored based on the code length information CLEN3, CLEN4 and the like.

In the case (ii), a restoration mode data "1", for example, is supplied to the coded data extraction part 72 via the terminal 80 so as to control the coded data reading circuit to a sequential restoration mode. A starting restoration stage ("1", "2", "3" or "4") is supplied to the coded data extraction part 72 via the terminal 81.

Similarly to the case (i) described above, the coded data extraction part 72 reads the header which is added to the beginning of the coded data sequence from the coded data storage part 71, and holds the code length information CLEN1 through CLEN4 of each restoration stage in the header holding part 78. The storing address calculation part 76 calculates the starting addresses P11, P21, P31 and P41 (where Plm denotes the starting address of the mth block of the lth stage) of the restoration stages based on the code length information CLEN1 through CLEN4. More particularly, the storing address calculation part 76 makes the calculation $P11=32$, $P21=P11+CLEN1$, $P31=P21+CLEN2$ and $P41=P31+CLEN3$, and holds the calculated starting addresses P11, P21, P31 and P41 in the storing address holding part 77.

First, the coded data (D1, ...) of the first block are read from the coded data storage part 71 starting from the starting address P11 (for example, $P11=32$) of the restoration stage "1", and the read coded data are supplied to the coded data extraction part 72 and the code length restoration part 73. The code length restoration part 73 refers to the code length table 74 to detect the coded data D1 and its code length while collating the pattern of the received coded data to the code length table 74. The detected code length is supplied to the code length adding part 75 and the coded data extraction part 72. For example, when the code length of the coded data D1 is "10", this value "10" is supplied to the code length adding part 75 and the coded data extraction part 72. In this state, it is known in the code length adding part 75 that the number of coded data is one, and thus, the code length adding part 75 supplies the code length "10" as it is to the storing address calculation part 76.

The storing address calculation part 76 adds the starting address P11 ($P11=32$) of the first block which is held in the storing address holding part 77 and the code length "10" of the coded data D1 of the first block of the restoration stage "1" received from the code length adding part 75, and renews the address of the restoration stage "1" held in the storing address holding part 77 to the starting address P12 (P12 = P11 + 10 = 42) of the second block. On the other hand, the coded data extraction part 72 extracts the coded data corresponding to the code length "10" which is received from the code length restoration part 73. That is, the coded data extraction part 72 extracts the coded data D1 of the first block of the restoration stage "1" and supplies the extracted coded data D1 to the restoration circuit via the terminal 82.

When the extraction of the coded data ends for the first block of the restoration stage "1", the coded data R0, I2,1.1, R0, I2,1.2, . . . of the first block of the restoration stage "2" are read out from the coded data storage part 71 based on the starting address P21 of the coded data sequence of the restoration stage "2". The starting address P21 is obtained by adding the starting address of the coded data sequence and the code length information CLEN1 which indicates the code length of the coded data sequence of the restoration stage "1". The read coded data are supplied to the coded data extraction part 72 and the code length restoration part 73. The code length restoration part 73 refers to the code length table 74 and restores the code length of the coded data R0, I2,1.1, R0, I2,1.2, . . . . The restored code length is supplied to the code length adding part 75 and the coded data extraction part 72. When the code length of the coded data R0 is "4" bits, for example, the value "4" is supplied to the code length adding part 75 and coded data extraction part 72.

It is known in the code length restoration part 73 and the code length adding part 75 that the number of coded data of the first block restored in the restoration stage "2" is four. Hence, the code length adding part 75 holds the code length "4" of the received coded data R0, and adds thereto the code lengths "8", "4" and "7" of the remaining three coded data I2,1.1, R0 and I2,1.2 which are successively received. An added value "23" is supplied from the code length adding part 75 to the storing address calculation part 76. The storing address calculation part 76 adds the starting address P21 of the coded data sequence of the restoration stage "2" held in the storing address holding part 77 and the code length "23" of the first block of the restoration stage "2" calculated in the code length adding part 75, and renews the address with respect to the first block of the restoration stage "2" held in the storing address holding part 77 to the starting address P22 (P22 = P21 + 23) of the second block.

On the other hand, the coded data extraction part 72 extracts the coded data which are successively received and has the code length which totals to "23". That is, the coded data extraction part 72 extracts the coded data (R0, I2,1.1, R0, I2,1.2) of the first block of the restoration stage "2" and supplies the extracted coded data to the restoration circuit via the terminal 82.

The coded data are extracted similarly for the restoration stages "3" and "4" and supplied to the restoration circuit via the terminal 82. As a result, the restoration of the coded data of the first block is completed.

The restoration process with respect to the second block is carried out similarly to the first block. First, the coded data D2, . . . of the second block are read out from the coded data storage part 71 based on the renewed starting address P12 (P12 = 42) of the second block of the restoration stage "1", and supplied to the coded data extraction part 72 and the code length restoration part 73. The code length restoration part 73 refers to the code length table 74 to detect the coded data D2 and its code length while collating the pattern of the received coded data to the code length table 74. The detected code length is supplied to the code length adding part 75 and the coded data extraction part 72. For example, when the code length of the coded data D2 is "10", this value "10" is supplied to the code length adding part 75 and the coded data extraction part 72. In this state, it is known in the code length adding part 75 that the number of coded data to be restored in the second block of the restoration stage "1" is one, and thus, the code length adding part 75 supplies the code length "10" as it is to the storing address calculation part 76.

The storing address calculation part 76 adds the starting address P12 (P12=42) of the second block of the restoration stage "1" held in the storing address holding part 77 and the code length "10" of the coded data D2 of the second block of the restoration stage "1" received from the code length adding part 75, and renews the address of the restoration stage "1" held in the storing address holding part 77 to the starting address P13 (P13=P12+10=52) of the third block. On the other hand, the coded data extraction part 72 extracts the coded data corresponding to the code length "10" which is received from the code length restoration part 73. That is, the coded data extraction part 72 extracts the coded data D2 of the second block of the restoration stage "2" and supplies the extracted coded data D2 to the restoration circuit via the terminal 82.

When the extraction of the coded data ends for the second block of the restoration stage "1", the coded data R0, I2,2.1, R1, I2,2.2, . . . of the second block of the restoration stage "2" are read out from the coded data storage part 71 based on the renewed starting address P22 of the coded data sequence of the restoration stage "2". The read coded data are supplied to the coded data extraction part 72 and the code length restoration part 73. The code length restoration part 73 refers to the code length table 74 and restores the code length of the coded data R0, I2,2.1, R1, I2,2.2, . . . . The restored code length is supplied to the code length adding part 75 and the coded data extraction part 72. When the code lengths of the coded data R0, I2,2.1, R1, I2,2.2, respectively are "4", "8", "5" and "6" bits, for example, these values are supplied to the code length adding part 75 and the coded data extraction part 72.

It is known in the code length restoration part 73 and the code length adding part 75 that the number of coded data of the second block restored in the restoration stage "2" is four. Hence, the code length adding part 75 holds the code length "4" of the received coded data R0, and adds thereto the code lengths "8", "5" and "6" of the remaining three coded data I2,2.1, R1 and I2,2.2 which are successively received. An added value "23" is supplied from the code length adding part 75 to the storing address calculation part 76. The storing address calculation part 76 adds the starting address P22 of the coded data sequence of the restoration stage "2" held in the storing address holding part 77 and the code length "23" of the second block of the restoration stage "2" calculated in the code length adding part 75, and renews the address with respect to the second block of the restoration stage "2" held in the storing address holding part 77 to the starting address P23 (P23=P22+23) of the third block.

On the other hand, the coded data extraction part 72 extracts the coded data which are successively received and has the code length which totals to "23". That is, the coded data extraction part 72 extracts the coded data (R0, I2,2.1, R1, I2,2.2) of the second block of the restoration stage "2" and supplies the extracted coded data to the restoration circuit via the terminal 82.

When the extraction of the coded data for the restoration stage "2" ends, the coded data of the second block are similarly extracted for the restoration stages "3" and "4". As a result, all of the coded data of the second block are extracted and supplied to the restoration circuit via the terminal 82.

By repeating the above described process for the entire image, the image is sequentially restored from the first block. In other words, when the block numbers are assigned from the top left to the bottom right of the image, the image is sequentially restored from the top left to the bottom right of the image.

A code restoration completion signal is included in the signals output from the code length restoration part 73. The code length is added every time the code length adding part 75 receives the code restoration completion signal. A storing address renew signal is included in the signals output from the coded data extraction part 72. This storing address renew signal is supplied to the storing address holding part 77, and the output of the code length adding part 75 is cleared when the address of the storing address holding part 77 is renewed in response to the storing address renew signal.

This embodiment was described for the case where one block is made up of 8×8 pixels and the number of gradation levels is 256. However, the number of pixels making up one block and the number of gradation levels are not limited to those of the embodiment.

Next, a description will be given of a third embodiment of the system for writing and reading coded data according to the present invention, by referring to FIGS. 21 through 23. This third embodiment of the system employs a third embodiment of a method of writing and reading coded data according to the present invention.

In this embodiment, the restoration stage of the progressive restoration is determined by the position, that is, the zigzag scanning address, of the DCT coefficients. For example, the correspondence of the stage and the position of the DCT coefficients are as shown in the following Table.

TABLE

| Stage | Position |
|---|---|
| "1" | 1 |
| "2" | 2 & 3 |
| "3" | 4 to 6 |
| "4" | 7 to 64 |

Figure 21A:
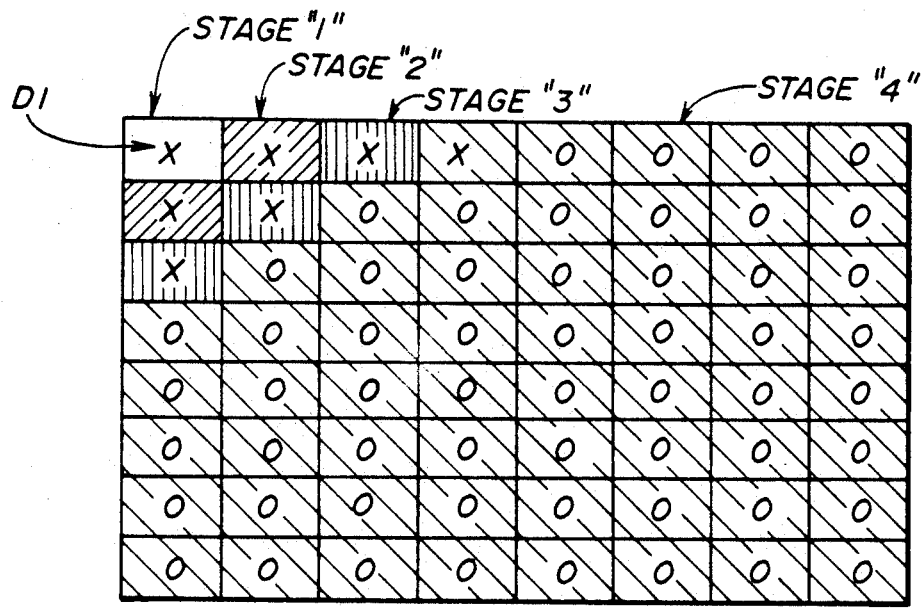
FIGS. 21A and 21B respectively show divided DCT coefficients for explaining a third embodiment of the system for writing and reading coded data according to the present invention.
Figure 21B:
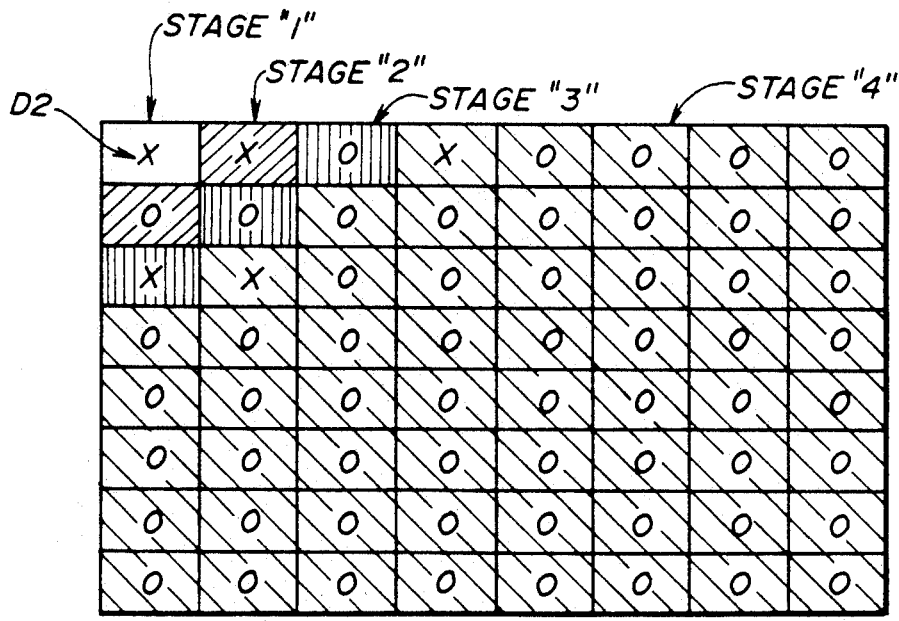

The divided DCT coefficients are shown in FIGS. 21A and 21B, and the coded data sequences of each stage is shown in FIG. 22.

Figure 23:
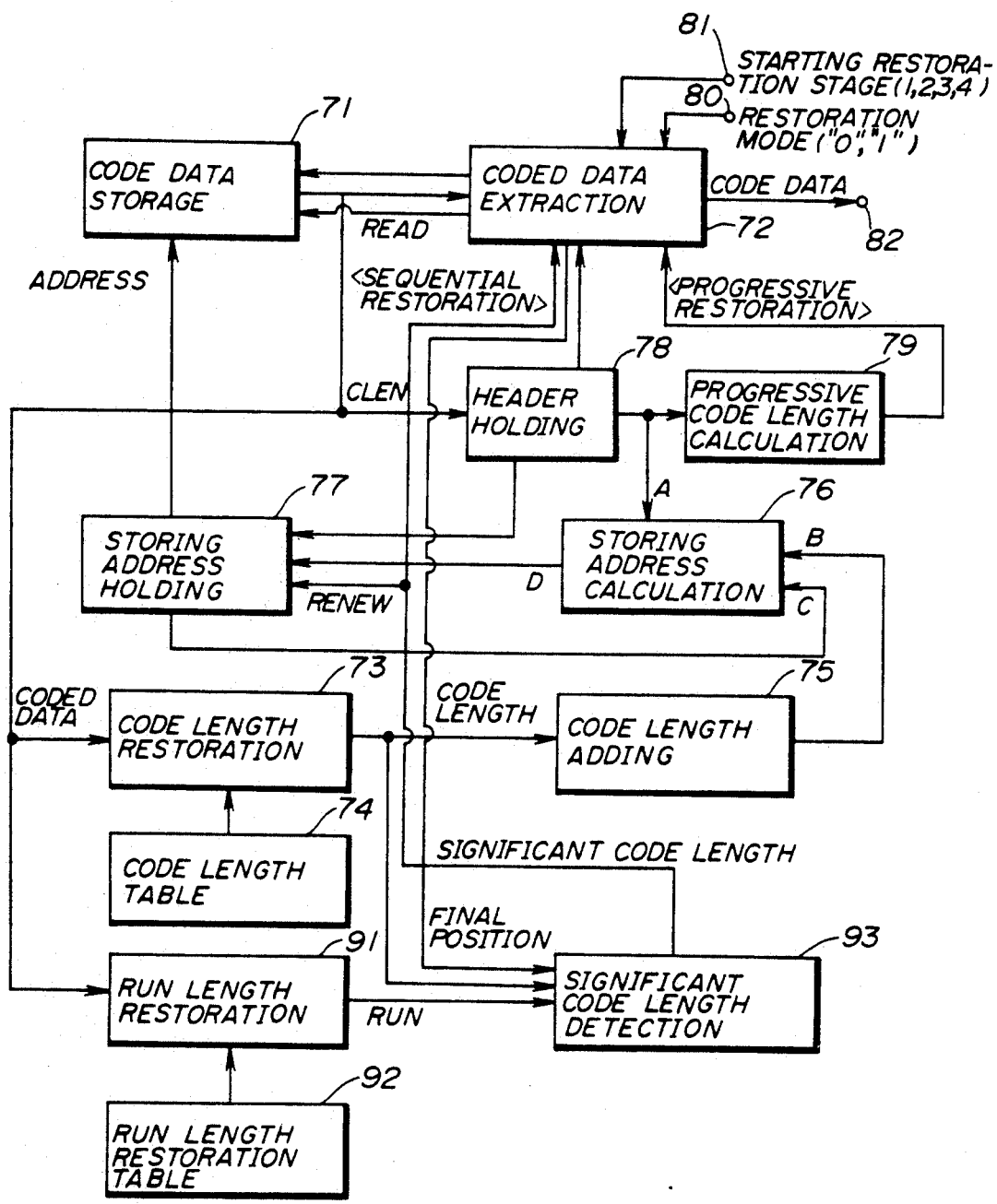
FIG. 23 is a system block diagram showing an essential part of the third embodiment of the system according to the present invention.

FIG. 23 shows a coded data reading circuit for reading the stored coded data from the coded data storage part 55 shown in FIG. 18 for the purpose of restoring the original image. In FIG. 23, those parts which are the same as those corresponding parts in FIG. 20 are designated by the same reference numerals, and a description thereof will be omitted. In FIG. 23, the coded data reading circuit comprises in addition to the elements shown in FIG. 20 a run length restoration part 91, a run length restoration table 92 and a significant code length detection part 93.

A description will be given of a case where the coded data are collectively stored for each restoration stage. When forming the coded data, the coefficient extraction part 51 shown in FIG. 18 extracts only the DCT coefficients which exist within the range of the position shown in the Table for each of the stages, and the extracted coded data are supplied to the variable length coding part 53. In the case of the DCT coefficients shown in FIGS. 21A and 21B, only the DC components (coefficients at the position 1) are extracted in each block of the stage "1", and the coded data sequences shown in FIG. 22 are produced. FIG. 21A shows the first block and FIG. 21B shows the second block. In FIGS. 21A and 22B, "X" denotes a non-zero coefficient. In the stage "2", only the DCT coefficients which exist within the range of the positions 2 to 3 are extracted, and the coded data sequences shown in FIG. 22 are similarly produced as in the stage "1". If the last DCT coefficient is zero in a stage, a code Reob is added to indicate the end of the stage (band). The coding takes place similarly thereafter, and the coded data sequences shown in FIG. 22 are produced from the DCT coefficients of the first and second blocks shown in FIGS. 21A and 21B for each stage.

When carrying out the progressive restoration in this embodiment, the coded data are continuously extracted from the beginning of the stage as in the case of the second embodiment.

On the other hand, when carrying out the sequential restoration in this embodiment, the run length is restored simultaneously as the restoration of the code length. That is, the run length restoration part 91 refers to the run length restoration table 92 to restore the run length. The restored run length is supplied to the significant code length detection part 93 which accumulates the run lengths for each block so as to obtain the positions of the DCT coefficients. The significant code length detection part 93 compares the obtained positions with the final position of the stage which is received from the coded data extraction part 72, and discriminates whether or not each coefficient belongs to the concerned block. In addition, when the run length restoration part 91 detects the code Reob, the run length restoration part 91 prohibits the significant code length detection part 93 from outputting the significant code length so that the coded data (Reob) is not output from the coded data extraction part 72. When the accumulated value in the significant code length detection part 75 matches the final position or the code Reob is detected in the significant code length detection part 75, the extraction of the coded data for the concerned stage is ended and a renew signal is output from the significant code length detection part 75. The rest of the operation of the coded data reading circuit shown in FIG. 23 is the same as that shown in FIG. 20.

Figure 24:
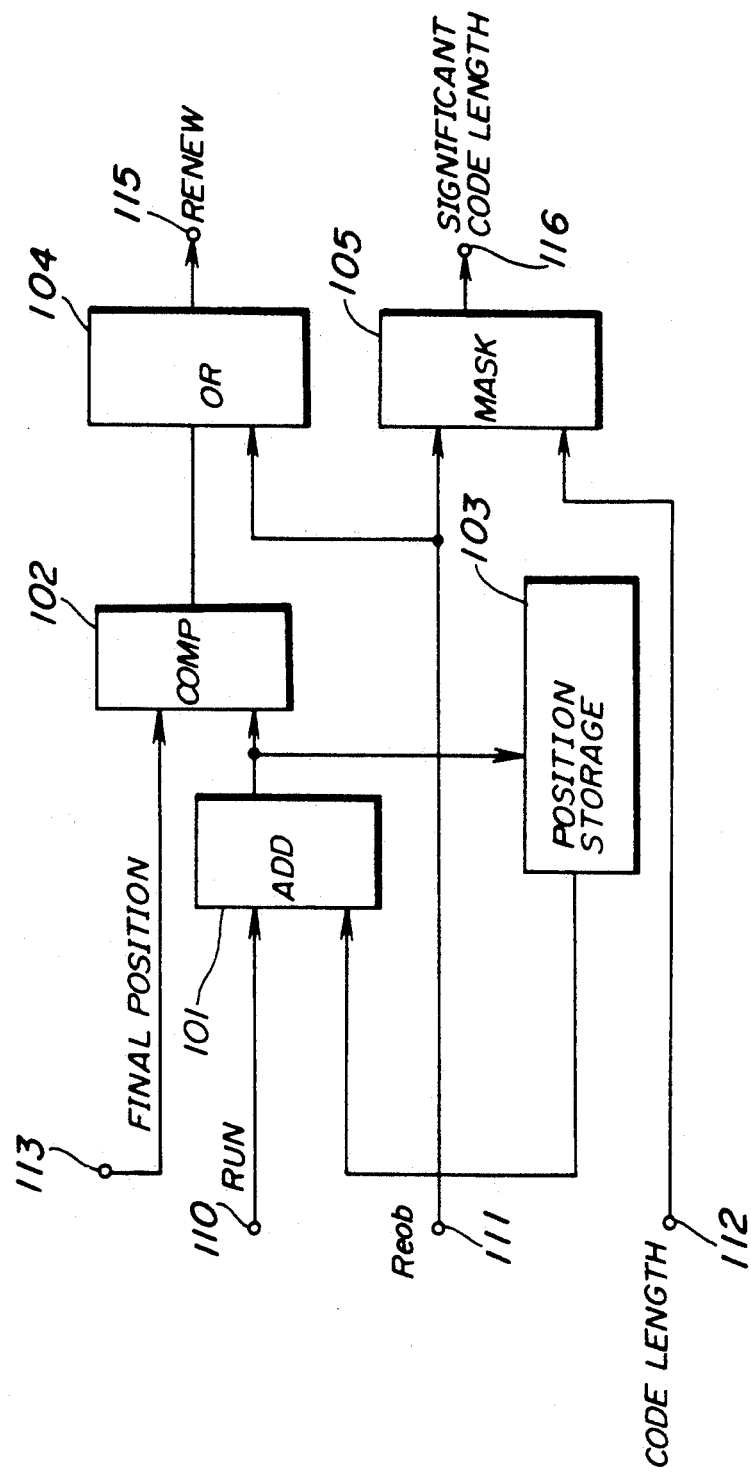
FIG. 24 is a system block diagram showing an embodiment of a significant code length detection part shown in FIG. 23.

FIG. 24 shows an embodiment of the significant code length detection part 93. In FIG. 24, the significant code length detection part 93 comprises an adder 101, a comparator 102, a position storage part 103, an OR circuit 104 and a mask circuit 105 which are connected as shown. The restored run length RUN from the run length restoration part 91 is applied to a terminal 110, and the code Reob when output from the run length restoration part 91 is applied to a terminal 111. The restored code length from the code length restoration part 73 is applied to a terminal 112. The final position which is received from the coded data extraction part 72 is applied to a terminal 113.

The adder 101 adds the restored run length RUN from the run length restoration part 91 and an accumulated value from the position storage part 103 which receives an output of the adder 101 and stores the position within the block. The output of the adder 101 is also supplied to the comparator 102 which compares the output of the adder 101 with the final position. The comparator 102 outputs a detection signal when the two compared positions coincide, and this detection signal is supplied to the OR circuit 104. The OR circuit 104 also receives the code Reob from the terminal 111, and a renew signal is output from the OR circuit 104 via a terminal 115. The mask circuit 105 receives the code Reob from the terminal 111 and the restored code length from the terminal 112, and outputs the significant code length via a terminal 116.

In the second and third embodiments, the coded data extraction part may have a construction similar to that shown in FIG. 14.

Further, the present invention is not limited to these embodiments, but various variations and modifications may be made without departing from the scope of the present invention.

What is claimed is:

1. A method of writing and reading coded data which are coded by an orthogonal transform coding including a plurality of restoration stages for restoring an original image, said original image being divided into blocks of an arbitrary number of pixels, said coded data being obtained by coding quantization coefficients which are obtained when gradation levels of the pixels within each of said blocks are subjected to a two-dimensional discrete cosine transform, said method comprising the steps of:

extracting the quantization coefficients for each restoration stage;
   subjecting the extracted quantization coefficients to a variable length coding;
   writing the variable length coded quantization coefficients into means for storage as the coded data;
   reading the coded data from the storage means;
   restoring a code length of the coded data based on the read coded data;
   extracting effective bits of coded data from a bit stream of the read coded data that defines the restored code length; and
   outputting the extracted effective bits of the coded data as coded data required in each restoration stage.

2. The method as claimed in claim 1 wherein said step of writing the variable length coded quantization coefficients writes all the variable length coded quantization coefficients within each block such that the variable length coded quantization coefficients are connected between the blocks and defines one image.

3. The method as claimed in claim 1 wherein said step of restoring the code length restores a sum code lengths of a number of coded data which are required in each restoration stage for each block when progressively restoring the original image.

4. The method as claimed in claim 3 which further comprises the step of calculating a starting address from which the coded data are read from the storage means based on the restored code length.

5. The method as claimed in claim 1 which further comprises the step of calculating a starting address from which the coded data are read from the storage means based on the restored code length.

6. The method as claimed in claim 5 wherein said step of extracting the coded data successively reads the coded data from the storage means based on the starting address calculated in said step of calculating the starting address when sequentially restoring the original image.

7. The method as claimed in claim 1 wherein the coded data stored in the storage means have a header which indicates a code quantity information for each restoration stage and a coded data sequence portion in which the coded data corresponding to a predetermined number of restoration stages are connected.

8. The method as claimed in claim 7 wherein said step of restoring the code length calculates the code length based on the code quantity information contained in the header.

9. The method as claimed in claim 8 which further comprises the step of:

calculating a starting address from which the coded data are read from the storage means based on the code quantity information contained in the header, said step of restoring the code length calculating the code length from a sum of the code quantity information for said predetermined number of restoration stages, said step of extracting the coded data successively reading the coded data from the storage means starting from the starting address of a first stage when progressively restoring the original image.

10. The method as claimed in claim 8 wherein said step of restoring the code length restores a sum of code lengths of a number of coded data which are required in each restoration stage for each block when sequentially restoring the original image.

11. The method as claimed in claim 7 which further comprises the steps of restoring a run length based on the coded data read from the storage means, and detecting a significant code length based on the restored run length, said step of extracting the coded data reading the coded data from the storage means in response to the detected significant code length.

12. A system for writing and reading coded data which are coded by an orthogonal transform coding including a plurality of restoration stages for restoring an original image, said original image being divided into blocks of an arbitrary number of pixels, said coded data being obtained by coding quantization coefficients which are obtained when gradation levels of the pixels within each of said blocks are subjected to a two-dimensional discrete cosine transform, said system comprising:

coefficient extraction means for extracting the quantization coefficients for each restoration stage;
   variable length coding means for subjecting the extracted quantization coefficients to a variable length coding;
   storage means for storing the variable length coded quantization coefficients as the coded data;
   code length restoration means for restoring a code length of the coded data based on the coded data read from said storage means; and
   coded data extraction means for extracting effective bits of the coded data from a bit stream of the read coded data that defines the restored code length, and for outputting the extracted effective bits of the coded data as coded data required in each restoration stage.

13. The system as claimed in claim 12 wherein said storage means writes all the variable length coded quantization coefficients within each block such that the variable length coded quantization coefficients are connected between the blocks and defines one image.

14. The system as claimed in claim 12 wherein said code length restoration means restores a sum code lengths of a number of coded data which are required in each restoration stage for each block when progressively restoring the original image.

15. The system as claimed in claim 14 which further comprises start address calculation means for calculating a starting address from which the coded data are read from the storage means based on the restored code length.

16. The system as claimed in claim 12 which further comprises start address calculation means for calculating a starting address form which the coded data are read from the storage means based on the restored code length.

17. The system as claimed in claim 16 wherein said coded data extraction means successively reads the coded data from the storage means based on the starting address calculated in said start address calculation means when sequentially restoring the original image.

18. The system as claimed in claim 12 wherein the coded data stored in the storage means have a header which indicates a code quantity information for each restoration stage and a coded data sequence portion in which the coded data corresponding to a predetermined number of restoration stages are connected.

19. The system as claimed in claim 18 wherein said code length restoration means calculates the code length based on the code quantity information contained in the header.

20. The system as claimed in claim 19 which further comprises:

starting address calculation means for calculating a starting address from which the coded data are read from the storage means based on the code quantity information contained in the header, said code length restoration means calculating the code length from a sum of the code quantity information for said predetermined number of restoration stages, said coded data extraction means successively reading the coded data from the storage means starting from the starting address of a first stage when progressively restoring the original image.

21. The system as claimed in claim 19 wherein said code length restoration means restores a sum of code lengths of a number of coded data which are required in each restoration stage for each block when sequentially restoring the original image.

22. The system as claimed in claim 18 which further comprises run length restoration means for restoring a run length based on the coded data read from the storage means, and significant code length detection means for detecting a significant code length based on the restored run length, said coded data extraction means reading the coded data from the storage means in response to the detected significant code length.

* * * * *